(12) United States Patent
Papp

(10) Patent No.: US 12,678,755 B2
(45) Date of Patent: Jul. 14, 2026

(54) METHOD AND DEVICE FOR LABORATORY FORMULATION AND CHEMICAL VENDING

(71) Applicant: Andrew A Papp, Los Angeles, CA (US)

(72) Inventor: Andrew A Papp, Los Angeles, CA (US)

( * ) Notice: Subject to any disclaimer, the term of this patent is extended or adjusted under 35 U.S.C. 154(b) by 626 days.

(21) Appl. No.: 18/100,575

(22) Filed: Jan. 24, 2023

(65) Prior Publication Data

US 2023/0158461 A1 May 25, 2023

Related U.S. Application Data

(63) Continuation of application No. 16/575,370, filed on Sep. 18, 2019, now Pat. No. 11,590,468.

(51) Int. Cl.
| | |
|---|---|
| *B01F 35/71* | (2022.01) |
| *B01F 33/452* | (2022.01) |
| *B01F 33/84* | (2022.01) |
| *B01L 3/02* | (2006.01) |
| *B67D 3/00* | (2006.01) |
| *G01G 19/22* | (2006.01) |
| *G01N 35/00* | (2006.01) |

(52) U.S. Cl.
CPC .......... *B01F 35/714* (2022.01); *B01F 33/452* (2022.01); *B01F 33/844* (2022.01); *B01L 3/0289* (2013.01); *B67D 3/0003* (2013.01); *G01G 19/22* (2013.01); *G01N 35/00584* (2013.01)

(58) Field of Classification Search
CPC .... B01F 2035/99; B01F 31/80; B01F 33/406;
B01F 33/45; B01F 33/338442; B01F 33/848; B01F 35/7139; B01F 35/90; B01F 35/714; B01F 33/452; B01F 33/844; B01L 2300/044; B01L 2300/0829; B01L 2300/123; B01L 2400/0481; B01L 3/523; B01L 3/527; B01L 3/0289; G01N 35/1002; G01N 35/1009; G01N 35/1079; G01N 35/00584; G01G 19/22; B67D 3/0003
See application file for complete search history.

(56) References Cited

U.S. PATENT DOCUMENTS

| | | | | |
|---|---|---|---|---|
| 10,578,634 | B2 * | 3/2020 | Lehtonen | B65B 3/04 |
| 11,590,468 | B1 * | 2/2023 | Papp | B01F 33/844 |
| 12,174,206 | B2 * | 12/2024 | O'Connor | G01N 1/312 |

(Continued)

*Primary Examiner* — Michael Collins

(57) ABSTRACT

An automatic chemical solution formulating device combines and mixes stored solids and liquids into user specified formulations and dispenses those formulations into containers. Chemical solids are stored in cartridges of material separated into predetermined dosages (for example in reeled blister packs), avoiding the need for weighing during formulation. Elements include user interface, computer-controlled automated loading and unloading port for reagent-containing cartridges, cartridge conveyor system, reader for identifying cartridges, blister-pack strip drive system, punching mechanism to release reagents, portioning chamber to mix solvent with solids or liquids with optional portioning, accommodating formulation delivery port, position sensors, liquid flow measuring devices, liquid and gas pumps and valves, and label printer. The combination of these elements allows high-speed formulation and dispensing of user-specified formulations.

16 Claims, 18 Drawing Sheets

(56)                References Cited

U.S. PATENT DOCUMENTS

| 2003/0158499 A1* | 8/2003 | Smith ................... B01F 33/452 |
| | | 600/573 |
| 2012/0241045 A1* | 9/2012 | Aouad ............... B01F 35/1453 |
| | | 141/83 |
| 2016/0175620 A1 | 6/2016 | Landa |
| 2021/0011043 A1* | 1/2021 | Mirashrafi ............. G01N 35/02 |
| 2021/0172969 A1* | 6/2021 | O'Connor .......... G01N 35/0099 |

* cited by examiner

401

502

503

405

401

502

503

504

METHOD AND DEVICE FOR LABORATORY FORMULATION AND CHEMICAL VENDING

FIELD OF THE INVENTION

The present invention relates to vending prepackaged chemicals to create user defined formulations.

BACKGROUND OF THE INVENTION

Manually formulating solutions is a tedious, time-consuming, and often repetitive process. This is particularly true in the field of molecular biology where doctorate-level scientists spend a significant amount of their time repetitively making solutions needed for their experiments. Some of these solutions are particularly tedious to prepare in that not only are the concentrations of the various reagents important, but the final pH is important as well.

Tedious manual operations include scraping, pouring, or scooping chemicals out of jars, weighing the chemicals, measuring purified water, stirring the solution, waiting for solutes to dissolve, and adjusting the pH by monitoring an instrument while adding acids and bases drop by drop, with more stirring, waiting, and iterative measurement. Long term storage of chemicals in jars along with this slow process allows excessive exposure to air and moisture resulting in clumping, changing of chemical weights due to absorption of water, and cross contamination due to shared mixing and measuring tools, as well as oxidation of some reagents. Solutions prepared this way, typically in beakers or flasks, must then be painstakingly decanted into bottles with small openings resulting in spills and messes. The preparer can be exposed to harmful chemicals and vapors. The process is prone to errors (such as arithmetic errors in calculating the amounts needed, misidentifying of reagents, and measurement errors). Errors often require remaking the entire preparation, or, if not caught, can result in costly ruined research.

There is a history of prior art devoted to automating the process of producing laboratory formulations, for example Lehtonen et al.'s "Automated solution dispenser" (US20140016432A1 and US20150314246A1) and Aouad's "Automated high precision solution preparation apparatus" (U.S. Pat. No. 9,138,693). These examples disclose aspects of formulating and dispensing solutions, hereby incorporated by reference in their entirety. However, all of the prior art falls unacceptably short in terms of the needs of typical science researchers. For example, while molecular biologists are highly skilled in their particular specialty, they are rarely skilled when it comes to maintaining an electromechanical device. Furthermore, laboratory environments are often secured, due to biohazards, thus inaccessible to dedicated maintenance personnel. Because, the current manual procedures are fairly straightforward, in that users weigh various items, mix them with various solvents, adjust the pH, and dispense the formulation into the vessels of their own choosing, a machine to replace this manual process is preferably faster, easy to use, easy to maintain, accurate, cost-effective, and compact in order to gain acceptance. The cited prior art falls short of these goals in many ways, including:

1. Refilling the apparatus with powders and liquids is slow and messy.
2. Refilling requires use of powders generating potentially hazardous dust.
3. Refilling creates the possibility of filling a bin with the incorrect reagent.

4. Powders are exposed to air, thus controlling humidity and oxidization is non-trivial.
5. Automated weighing of the reagents during formulation is slow and error-prone, requiring queuing up of orders or wastes users' time if they wish to retain full custody of their formulations.
6. Queuing of orders requires additional mechanisms and space for bottle handling, and accommodates only one size and shape of delivery bottle.
7. Weighing hygroscopic chemicals without precise humidity control leads to inaccuracy due to increased weight or the reagent itself because of water absorption.
8. Accurately monitoring the quantities remaining in powder bins is problematic or expensive. For example power that clumps or sticks in a reagent bin is unavailable for use.
9. A chemical may run out during formulation, shutting down the entire machine until the bin is refilled by designated personnel who may not be available.
10. Dispensing powders for measurement requires various combinations of vibration, grinding and screw transport mechanisms.
11. Refilling and device maintenance requires specially-trained personnel.
12. Elaborate mechanisms make equipment maintenance difficult/complex, which is a particular problem in a secured area where repairpeople are not allowed.
13. Elaborate mechanisms make modular construction difficult further increasing maintenance difficulty.
14. Creating solutions of a specific pH requires the slow process of stirring and titration.

The present invention addresses all of the proceeding problems by using pre-measured chemicals in cartridges and a modular approach. Gim describes a system for dispensing pre-measured amounts of a drug that is blister-packed in a strip, but his device, "Manifold for use in medicament dispenser" is a mere hand-held dispenser and not disposed to the task of automated, high-speed formulation.

SUMMARY OF THE INVENTION

The present invention addresses the deficiencies of the prior art. Automated dispensing of reagents from small pre-measured encapsulations obviates the need for handling of liquids and loose powders. Computer-readable, tagged cartridges eliminate the possibility of loading the incorrect reagent. Rapid, automated dispensing of pre-measured unit quantities (quanta) of reagents eliminates the slow process of weighing reagents, allowing for users to make their solutions in real time, maintaining custody of the entire process, and eliminating the need for a bottle queue handling system. A system of mixing computed quantities of acidic and basic (alkaline) pH buffers allows for rapid formulation of a chosen pH by eliminating the need for painstaking titration. The cartridge packaging and encapsulation also eliminate errors due to oxidized reagents and humidity absorption. Real time inventory data prevents beginning orders that cannot be completed due to insufficient reagent. User-friendly cartridges can be changed by any novice who would be able to load a Compact Disc or a VHS video tape (although young people may not know of these easy-to-load devices of days gone by). Modular construction allows untrained laboratory personnel to maintain the machine in areas with limited access.

The present invention is a system for rapid formulation of various standard and customized solutions, liquids, and suspensions specified by users through a streamlined user interface. The system comprises a modular machine and modular cartridges where each cartridge contains a specific reagent that is packaged to be dispensed in one or multiple known pre-measured quantities (quanta). The machine includes a user interface to its computer.

According to one aspect, a computer system for controlling a dispensing system May comprise a graphical display, an input device, a communication interface, a processor, and software. The computer executes algorithms including, for examples, those that compute needed quantities of reagents required to formulate solutions requested by the user and those that compute safe methods for mixing the required reagents and/or the monetary cost of the requested solution. The algorithms may also warn the user, via the user interface, for example, of insufficient quantities of reagents, potentially unsafe combinations of reagents, and/or potentially excessive cost of reagents.

According to another aspect, the computer may control hardware such as, for examples, a conveyor positioning system carrying the modular cartridges and/or devices disposed to interact with the cartridges, a cartridge inventory system, a reagent ejection system, a reagent mixing system, an intermediate solution portioning system, a gated product delivery port, a formulation sterilization system, an optional automated bottling system, a self-cleaning system, and a waste management system.

Each modular cartridge provides an enclosure for multiple quanta of a specific reagent. Possible encapsulation systems for quanta of reagents in the cartridge include blister pack, actual capsules, and compressed pills, among others. Each cartridge is equipped with an identification tag. The tag may include information such as the particular reagent, a unique serial number, remaining quantity of contents, material safety data, manufacturing date, lot number, price, quantity of reagent per quanta, a proprietary ID code, a security code, other types of data, and changeable storage/memory. Cartridges may include integral dispensing equipment, for example rollers, sprockets, blister-pack punches, and moving parts that deliver pre-measured quanta of reagents by any means and they may include an integral mechanism to store spent material used to encapsulate its quanta. Cartridges may include features that interact with an embodiment of the dispensing machine, for examples, elements disposed to engage springs, pistons, guides, and magnets.

The modular machine may include the following items, and in some cases may include redundant copies of them for fail-safe operation: an enclosure, one or more liquid supplies (these can be for water, alcohol, oil, or any liquids to be used in formation or self-cleaning), an electrical supply, a cartridge tag reader (and possibly a cartridge tag updater/ writer), a dispenser, a cartridge entry/exit port, a computer, a label printer, and a gated product delivery port. In turn, the dispenser could include a loading and unloading port for cartridges, a conveyor system for cartridges and/or devices that interact with cartridges, a blister roller drive system, a punching mechanism to release reagents, a portioning chamber to mix water or other chosen liquids with solids or liquids—with optional portioning, a compliant formulation delivery port, position sensors, liquid flow measuring devices, liquid and gas pumps and valves, a label printer, and items creating a user interface. As will be evident in the Detailed Description of a Preferred Embodiment, combinations of these elements allow for practical, high-speed formulation and dispensing of user-specified formulations that was not possible with prior art.

DETAILED DESCRIPTION OF A PREFERRED EMBODIMENT

Figure 1:
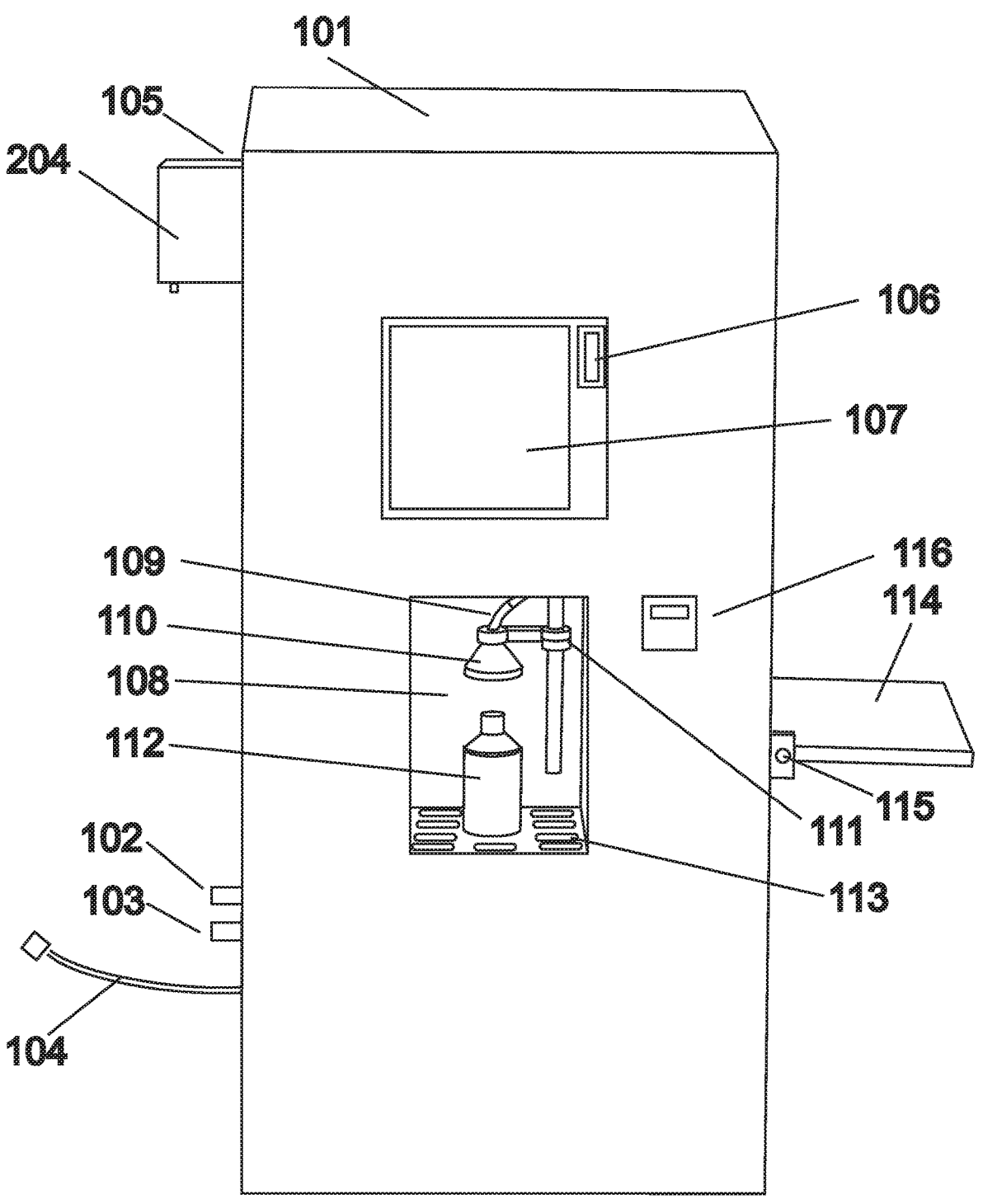
FIG. 1 is a view of a solution dispensing device in accordance with the present invention shown in a front perspective view.

It should be understood that the figures and following descriptions are of exemplary embodiments of the present invention and are not intended to limit the scope of the invention in any manner. Other variations and embodiments of the present invention would be apparent to persons of ordinary skill in the art without departing from the spirit and principles of the invention, and all such variations and embodiments are intended to be included within the scope of the disclosure for the present invention and protected by the accompanying claims.

Definitions

Throughout this document I use the words "reagents" and "chemicals". In the context of this application, these words are used interchangeably and both defined broadly to include virtually any substance, for example pure elements such as sulfur; complex molecules such as salts, acids, solvents, and proteins; and even complex mixtures such as yeast extract. I used the word "quanta" to mean multiples of discrete known (pre-measured) quantities. Video camera is defined as any electronic device for the transmission of an image. I use the word Software to mean any code, instructions, or data used in relation to an electronic or electromagnetic device without regard as to whether that information can be changed and without regard to where or if that information is stored. Some examples include "firmware", embedded code, linear circuits that can compute, and data available over a computer or telecommunications network.
A New Method for Rapid, Convenient Formulation of Solutions, Suspensions, and Liquids The current invention can be thought of as a new method for rapid, convenient formulation of solutions, suspensions, and liquids through the creation of reagent-containing cartridges that are designed to rapidly deliver multiples of a particular quantity (quanta) of a particular reagent via the creation of a complementary dispensing machine without the need for weighing the reagents. The method is largely executed by a computer that obtains information from a user as to the desired formulation, calculates which reagent cartridges are needed and how many quanta are needed from each. Ultimately, the computer directs the dispensing of these quanta into any appropriate vessel provided by the user (typically mixed with a specifically calculated quantity of water or another liquid such as an organic solvent, as needed to complete the formulation. Preferably, the method contains other steps to maximize its usefulness. For example, I have created a very streamlined User-interface that allows users to communicate their desired formulations to the dispensing machine, a Duplicate Cartridge Protocol that prevents running out of any reagents or wasting any quanta of reagents that would otherwise be caused by preemptively changing cartridges before they are fully exhausted, and I have created a mixing/sub-portioning chamber and protocol that allows the dispensing machine to maximize accuracy, when needed, by subdividing the amount of reagent in a quanta.
Advantages of Dispensing Known Quanta Vs. Weighing Weighing is generally a slow process that involves carefully pouring and then iteratively sprinkling a reagent into a vessel on a scale and waiting for the scale to settle. Even when great care is taken, sometimes too much reagent falls on the scale and then there is the problem of what to do with it. Furthermore, it is common for scales to break down or deviate from calibrated values. While on the scale and beforehand, to they extent that they are hygroscopic, many reagents absorb moisture from the air which makes even an accurate weight measurement inaccurate in terms of actual reagent quantity. On the other hand, dispensing known pre-measured quantities can be done almost instantaneously. There are many ways to release pre-measured quantities of reagent that fall within the scope of the present invention, for example many reagents can be compressed into pill form, contained in individual capsules, or dispensed by a measuring slider or vaned wheel from a hermetically sealed cartridge, etc. However, many of the best features are embodied in the preferred new method of encapsulating known amounts of the reagents in the cells of long strips of blister-pack, and having the strip stored, in rolled, reeled, zigzag or other form in a cartridge with an exit port through which the blister-pack strip can be dispensed.
Features of the Blister-Pack Strip For the highest formulation speed, the blisters are pre-loaded with quanta of chemicals such that one or multiple blisters contain quantities commonly used in formulations. This means that quanta can be used directly without any need for sub-portioning. Alternatively, in an embodiment optimized for ease-of-manufacturing, the blisters are just "filled" and, through lot analysis, the dosage of chemical per blister is recorded in each cartridge's data memory or stored in a database accessible to the computer of the present invention. The dispensing machine reads this data and uses it to compute how many quanta to use and how to portion the last quanta if a specified precision demands doing so.

Preferably the blister strip consists of a two dimensional array of chemical blisters 3 to 10 blisters wide and hundreds or thousands of rows long. The punch block consists of punches which impact the blisters, rupturing them, and causing the contents to be emitted into a portioning/mixing chamber or directly into the user's vessel. This is much faster than weighing the chemicals as described in the prior art. The punch mechanism is much more durable than a weighing scale and never requires calibration, so it is amenable to modular construction and reduces maintenance needs.

In one embodiment, blister strips are formed by thermo-forming Polyvinylidene chloride (PVDC) backed Polyvinyl chloride (PVC), which provides a very high moisture and oxygen barrier such that all materials of the blister strip have a water vapor transmission rate of less than 0.2 grams per meter squared per day. A lidding film of thin plastic and/or pinhole free aluminum foil contains the chemicals in the blisters until the film is ruptured by the action of the punch on the blister.

Figure 4:
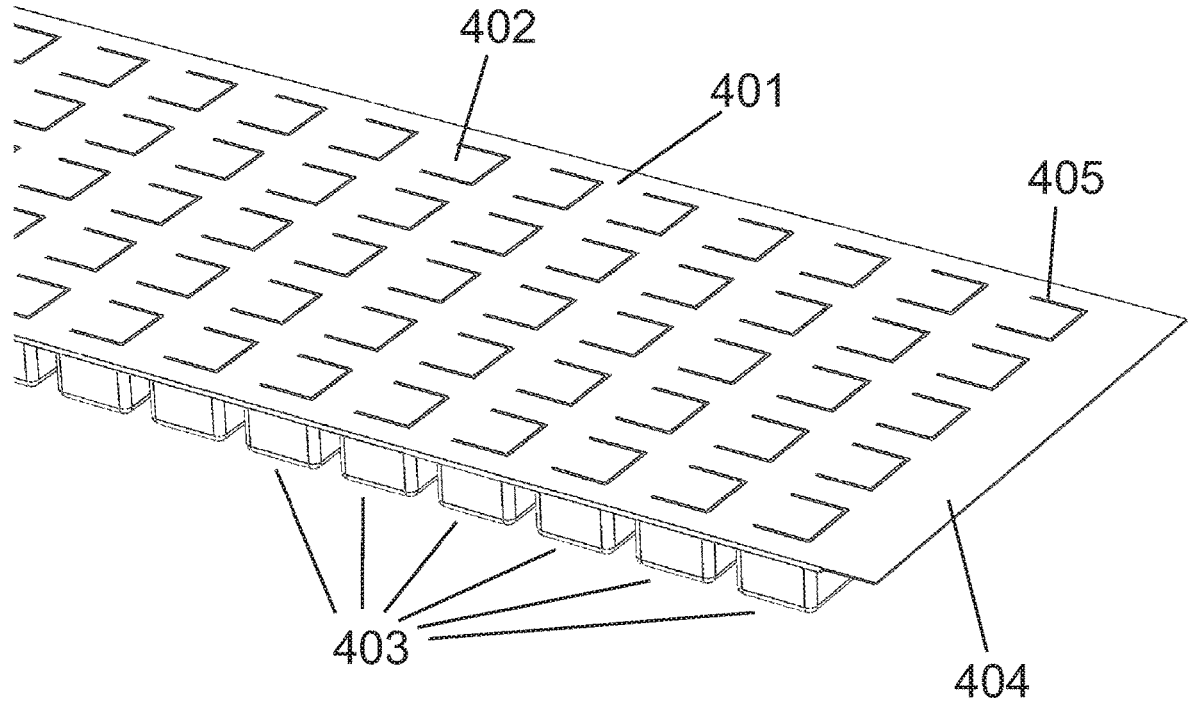
FIG. 4 is a perspective view of a portion of the cover side of an unused blister-pack strip in accordance with the present invention.
Figure 5A:
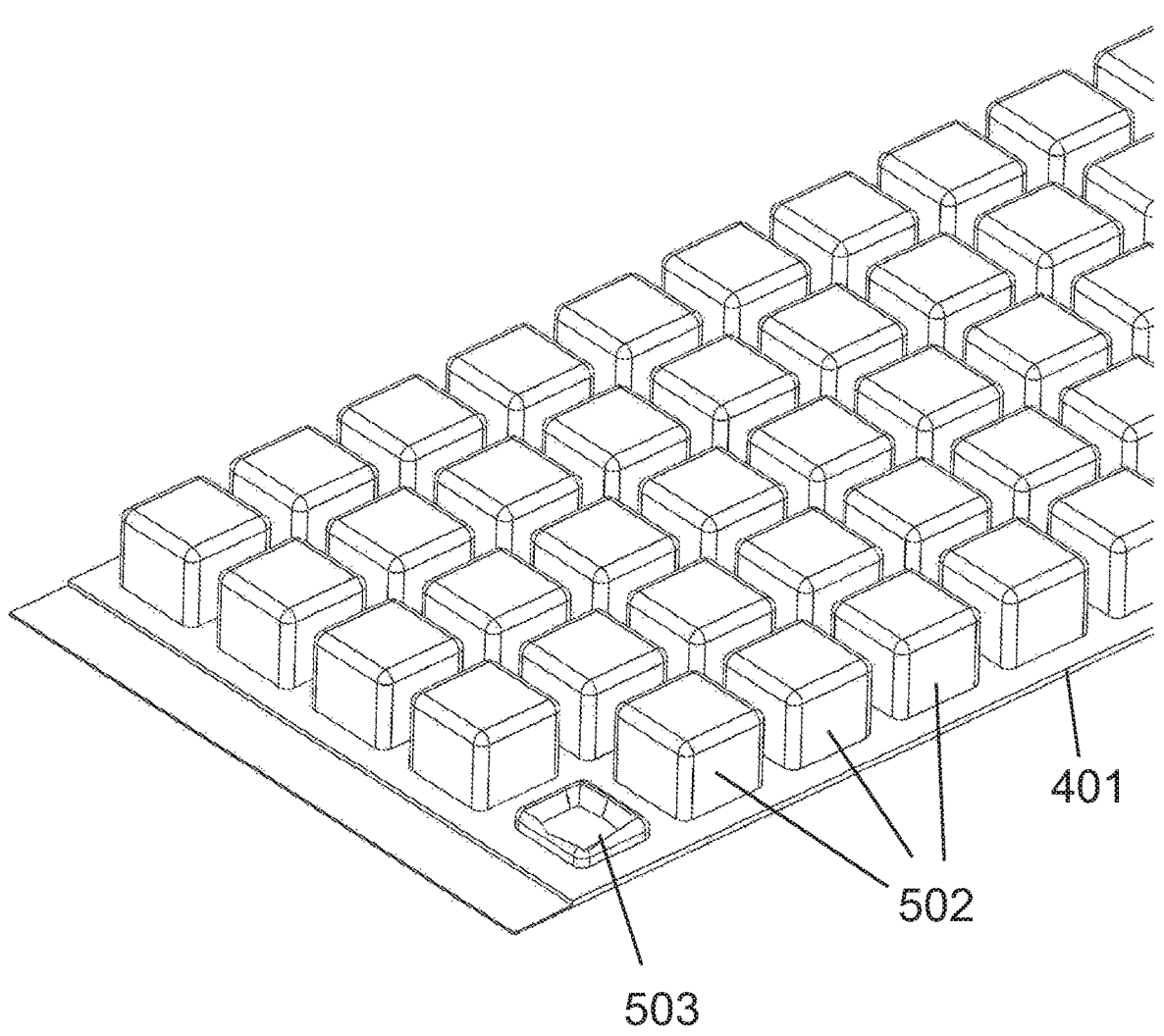
FIG. 5A is a perspective view of a portion of the blister side of a blister-pack strip with one blister crushed in accordance with the present invention.
Figure 5B:
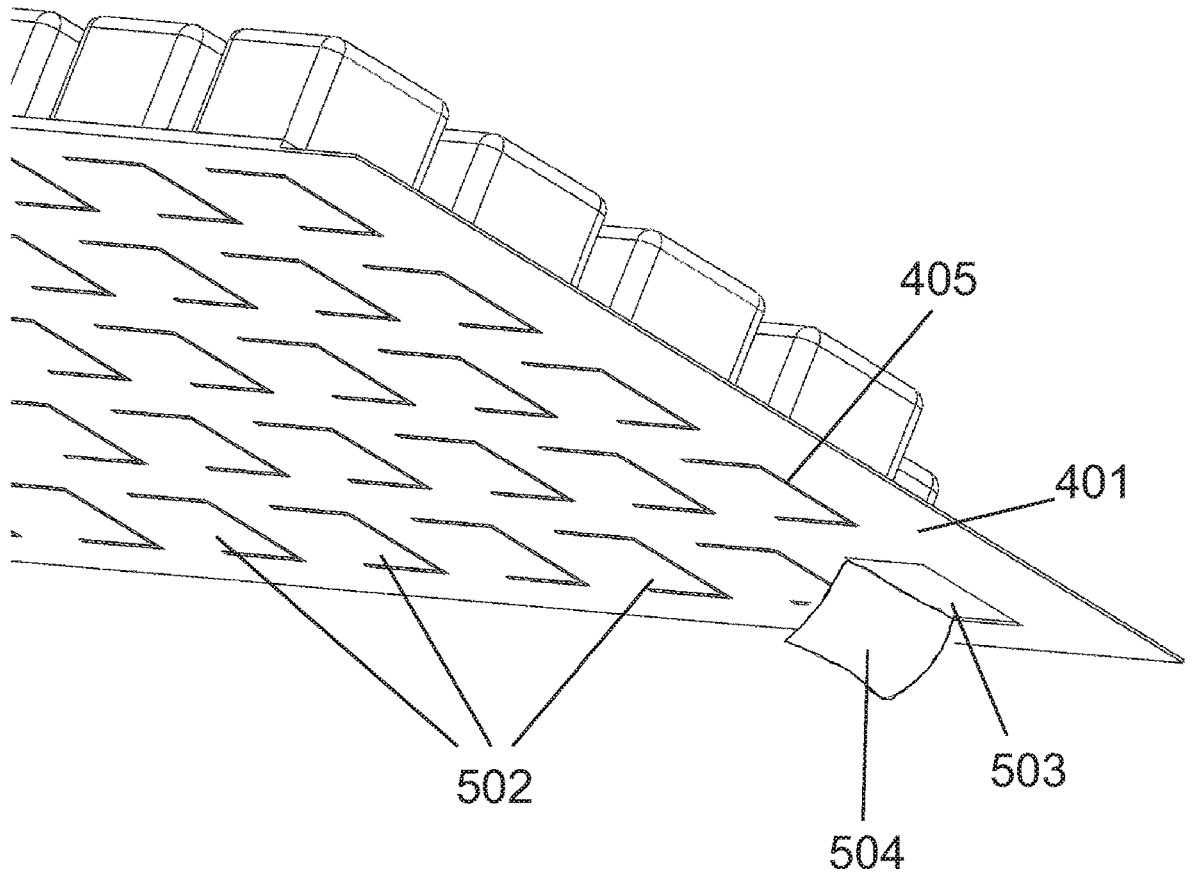
FIG. 5B is a perspective view of a portion of the cover side of a blister-pack strip with one blister punched and its cover torn open, in accordance with the present invention.

The blister pack consists of a formed tray, FIG. 4, 401, holding one quanta of substance 402 in each of a multitude of blister cells 403. The tray 401 is sealed by an affixed cover 404. The cover is weakened by thinning along a pattern 405 located over each blister, such that the cover will break along that pattern due to the force transmitted through the quanta of reagent when pressure is applied to the back side of the matching blister by a punch such as one of 902 in FIG. 9 or an alternative in FIG. 8. The cover remains attached to the blister by the unweakened region as shown by element 504 in FIG. 5B. Punched blister 503 resulting from the action of the punch is shown in FIG. 5A and can be understood by comparison with unpunched blisters 502.

Features of Blister-Pack Strip Cartridges

In addition to housing a useful quantity of blister-pack strip, the cartridges have several preferred features. Typically, the reagent cartridge housing is injection molded from impact and chemically-resistant plastic and contains the reel of blister-packed reagent quanta which is reeled out from an exit aperture preferably located near the bottom of the cartridge. New cartridges can be supplied with a protective cover protecting the strip exit aperture. A person loading the cartridge would then remove the protective cover, exposing a small leader strip of blister such that the strip can easily be engaged by the punching apparatus. In some embodiments, the cartridges are identified by an active RFID chip permanently attached to the cartridge. The active RFID chip (with readable and writeable memory) can store the quantity of chemical quanta remaining and the column position of the first unused blister in the first row by updating the value each time one or more quanta are used. In other embodiments, a passive RFID tag or printed label only identifies the reagent itself, and the quantity remaining and related data are tracked in the computer control system. In further embodiments, a bar code or other machine-readable code, permanently attached to the cartridge, uniquely identifies the cartridge itself, and all other data regarding the reagent are stored in storage accessible by the computer control system. Some of the other useful data than can be stored in the cartridge memory are: manufacture date, lot number, installation date and time, expiration date, proper name and aliases of the reagent, Material Safety Data Sheet information, lot analysis value of reagent per blister, a unique serial number, a security code, an ownership code, cost or reagent per blister, a list of authorized users. Any combination of data can be stored in the cartridge vs stored in the dispensing machine's computerized inventory control memory. With internet or other connectivity, the dispensing machine's computer and download any data not stored in the cartridge and upload use data.

Figure 3A:
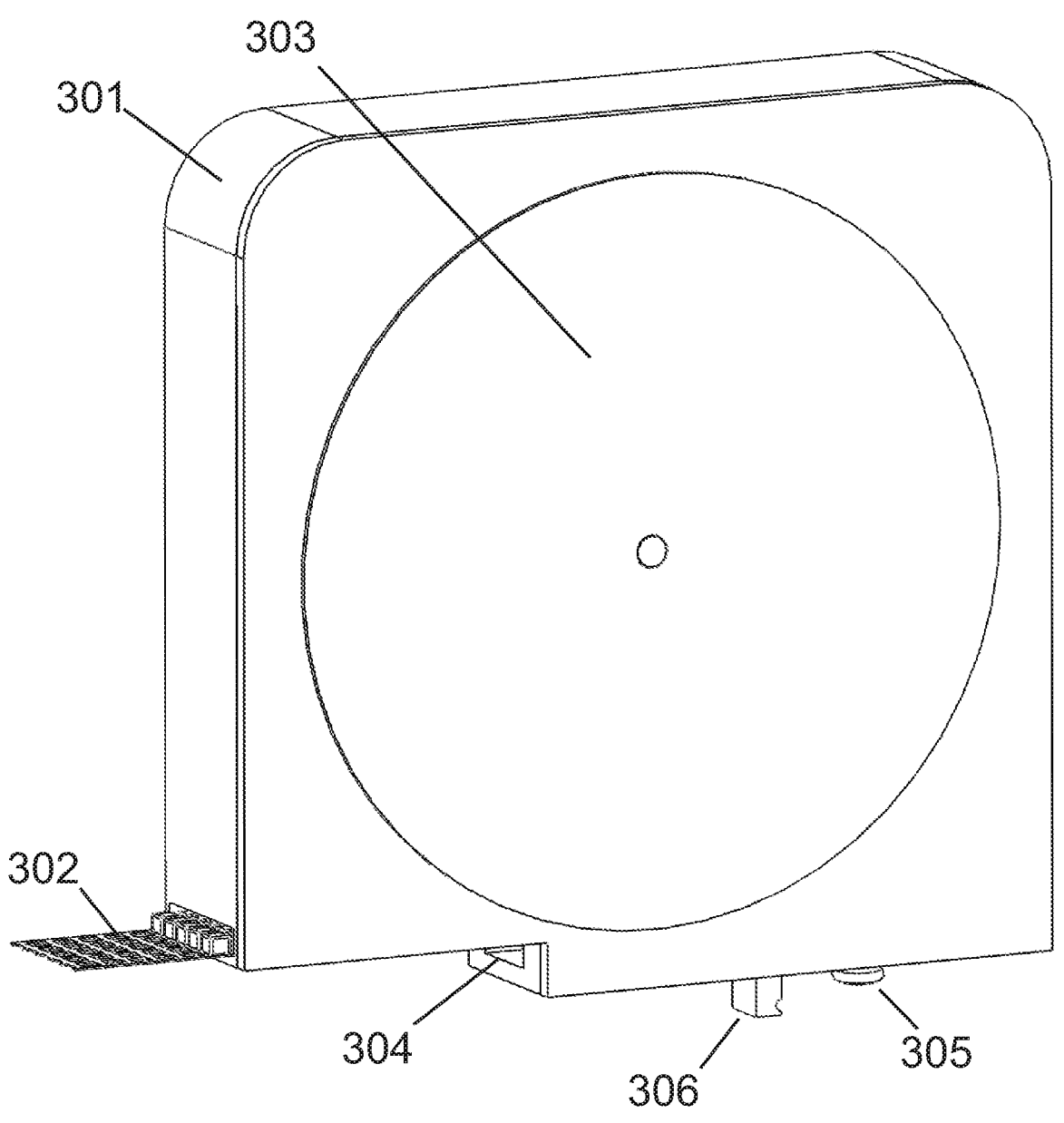
FIG. 3A is a side perspective view of a chemical reagent cartridge with a blister-pack strip protruding and blister-pack strip reel showing, though it would typically be covered, in accordance with the present invention.

A chemical cartridge, 301, applicable to the present invention, is shown in FIG. 3A with a housing manufactured by injection molding a durable, chemically inert plastic such as polypropylene, though other plastics, well known to those versed in the arts of chemistry and plastic molding/fabrication, may be more suitable to ensure chemical resistance to specific reagents that are present. A reel, 303, which can also be injection molded from plastic such as polypropylene, contains a long strip of coiled, blister-packed chemical that is preferably several blisters wide and thousands of blisters in length in a preferred embodiment. The end of the blister-pack strip, 302 is shown exiting an aperture in the housing. Reel 303, is typically enclosed by a cover that is not shown. Alternatively, the cartridge can contain a coil of blister-pack strip not on a reel. 304 is a concave feature suitably shaped so as to engage a spring which urges the cartridge toward the outer direction of the carousel to maintain it in the default retracted position. A tab, 306, provides a surface against which a linear actuator can push to move a particular cartridge toward the center of the carousel when that cartridge is chosen for dispensing. Track guide 305 engages in the carousel carriage (607 of FIG. 7) as an attachment and/or guide. By using position sensors and/or communication with the cartridge and/or machine vision, positive verifiable engagement with each bona fide cartridge can be assured.

Figure 3B:
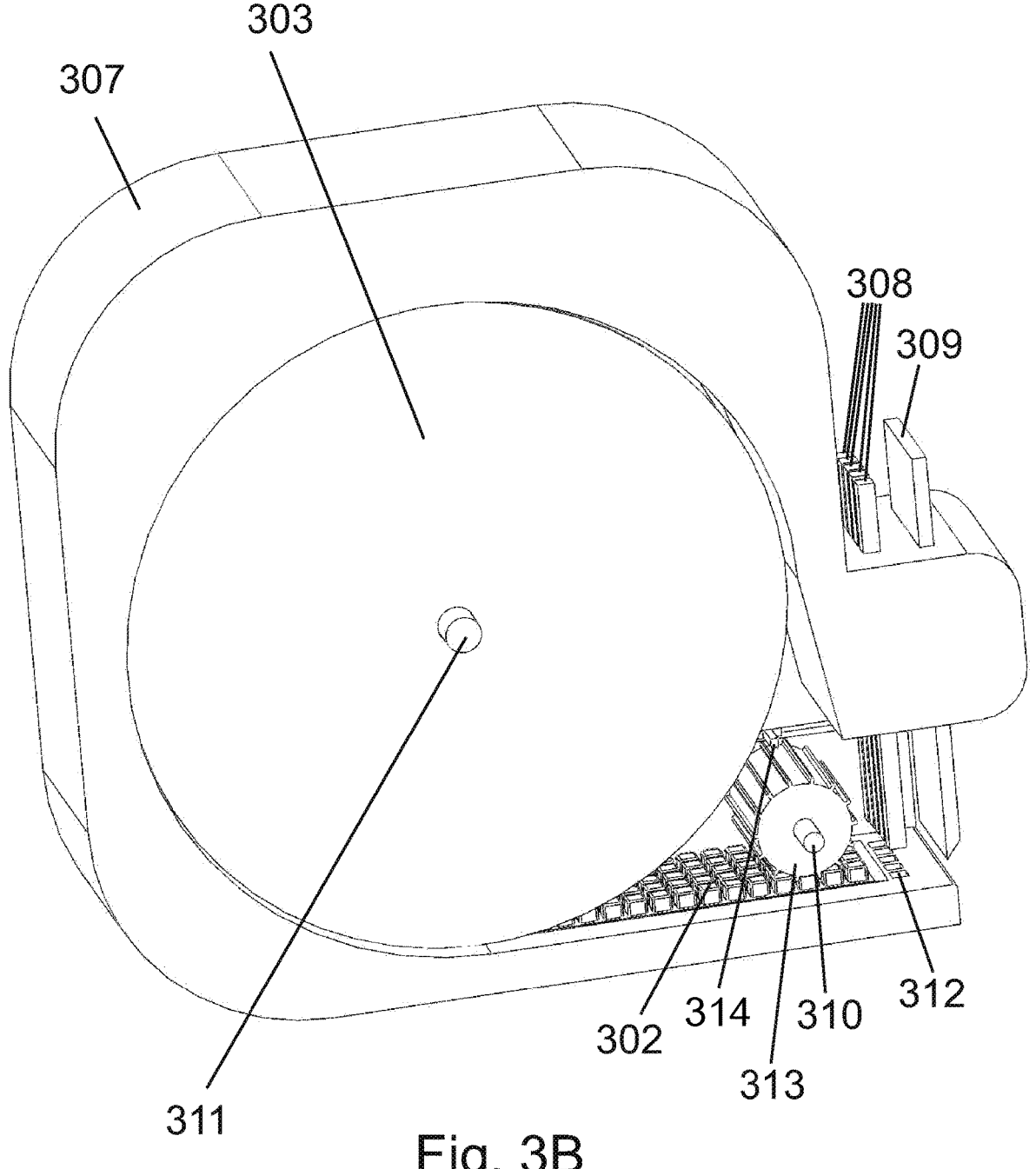
FIG. 3B is a side perspective view of an alternative chemical reagent cartridge with a blister-pack strip protruding and blister-pack strip reel as well as an optional sprocket drive and blister punching mechanism showing, though these would typically be covered, in accordance with the present invention.

Alternatively, for greater modular independence, the cartridge can contain its own active drive mechanism, for example, a geared down motor and one or more friction wheels, such that it can engage and disengage itself from the dispensing zone without any need for external motors or springs. Cartridge designs exemplified by FIG. 3A interact with a blister-pack strip punch and trimming assembly such as the ones outlined in FIG. 9 and FIG. 15. Alternatively, for greater modular independence and redundancy, a preferred cartridge can contain its own blister-pack strip punch and trimming assembly as shown in FIG. 3B. Blister reel 303 and sprocket 313 are supported in enclosure 307 via axles 311 and 310, respectively. Blister strip 302 (as numbered in FIG. 3A) is advanced to the right until the first row of blisters is positioned over die holes 312 and beneath punches 308. This is accomplished when an external actuator pushes pawl 314 to the left, resulting in counter-clockwise rotation of sprocket 313. Each reciprocating movement of 314 is designed to rotate 313 by exactly the right amount to advance the blister-pack strip such that the next row of blisters is positioned over the die holes. Once positioned, the required number of punches 308 are all actuated downward by actuators such as a solenoids or a pneumatic cylinders (preferably simultaneously) to dispense the number of blisters needed for the formulation. Optional springs raise the punches back up. Optional sensors confirm ejection. If more quanta are needed than the number present in the first row, 314 is pushed to advance to the next row and the dispensing cycle continues. Using this high-speed procedure, many rows of blisters can be dispensed per second to deliver the need amount of reagent precisely and rapidly. Excess spent blister strip can be sheared off by guillotine blade 309 such that it falls into a solid waste collection bin. In another preferred cartridge embodiment, the blister strip is wound around a spool without the large sides present in reel 303 and a second spool, not show, is disposed to wind up the spent blister strip. Axle 311 and the second spool's axle (not shown) are retained in diagonal slots so that the waste spool's roll has room to grow in diameter as the blister strip spool's roll shrinks, thus maximizing space utilization in the cartridge.

The blister dispensing cartridges described above can contain and deliver virtually any solid, liquid, gel, etc., but it is to be understood that other cartridge designs will likely be advantageous for some liquids and for dispensing extra large amounts of solid material. It is to be understood that the present invention includes any design that delivers measured quanta of reagents.

The Formulating Machine Makes the Cartridges and Other Components Formulate

The formulating machine of the present invention, shown in FIG. 1, has a durable cabinet 101 made of material such as stainless steel sheet. AC power is provided via cord 104. Water and/or other liquids of choice such as alcohol, an oil, an acid, a base, a solvent, an oil, etc. are supplied via port 102. A preferred embodiment may include a water purification system that uses reverse osmosis, distillation, and/or various forms of filtration/binding/chromatography. Alternatively, the system can be supplied with water already of sufficient purity for the needs of the user. Liquid waste is discarded via liquid waste port 103. The embodiment is preferably configurable so that, depending on the types or reagents used and local rules, the waste can optionally be sequestered for later disposal or sent directly into the building drainage system (with additional dilution as specified by the computer based on the Material Safety Data Sheet information associated with the used cartridges. The machine is loaded with a plurality of reagent-containing cartridges, such as 204, via port 105. User input regarding the desired formulations and other matters can be elicited and received via touchscreen 107. User identification and payment information can also be obtained via mag stripe/ chip/RFID reader 106. Touchscreens and mag stripe/chip/ RFID readers are well known to those versed in the art of commercial kiosk devices such as ATMs and Semi-Attended Customer-Activated Terminal (SACAT) machines. A user-supplied bottle 112 shown in the bottle filling chamber 108, is set on grill 113 and output tube 109 is positioned over the opening of the bottle. Lighting is provided in the filling chamber to aid in positioning. Accurate lineup is assisted by accommodating guide 110 and Selective Compliance Articulated Robot Arm (SCARA) 111, which holds the output tube in position due to sufficient friction supplied by the joints of the arm. Accommodating guide 110 accurately centers output tube 109 to a wide range of vessel opening shapes and sizes. For example guide 110 can be inverted funnel-shaped and can be lowered onto the opening of the vessel until contact and concentricity are achieved when the cross-sectional diameter of the guide matches the outside of the opening of the vessel. Alternatively a guide could be conically shaped and guide by contact with the inside of the vessel opening. Alternatively a guide constructed of an elastic material could provide a variable diameter opening that embraces the outside diameter of the vessel. Chamber 108 is preferably covered by a clear, water-tight sliding door (not shown) that can be locked into position during self-cleaning operations. A label printer 116 prints a self-adhesive label. with no backing, that the user may affix to the bottle after vending of the formulation is complete, possibly using one hand. The label printer can print an additional label for the user's notebook to document the formulation. Integrated stowable table 114 supported on hinge 115 pivots between a vertical stowed position and a horizontal deployed position and provides convenient storage for various empty and filled bottles belonging to the user without taking up space when not in use.

Figure 2A:
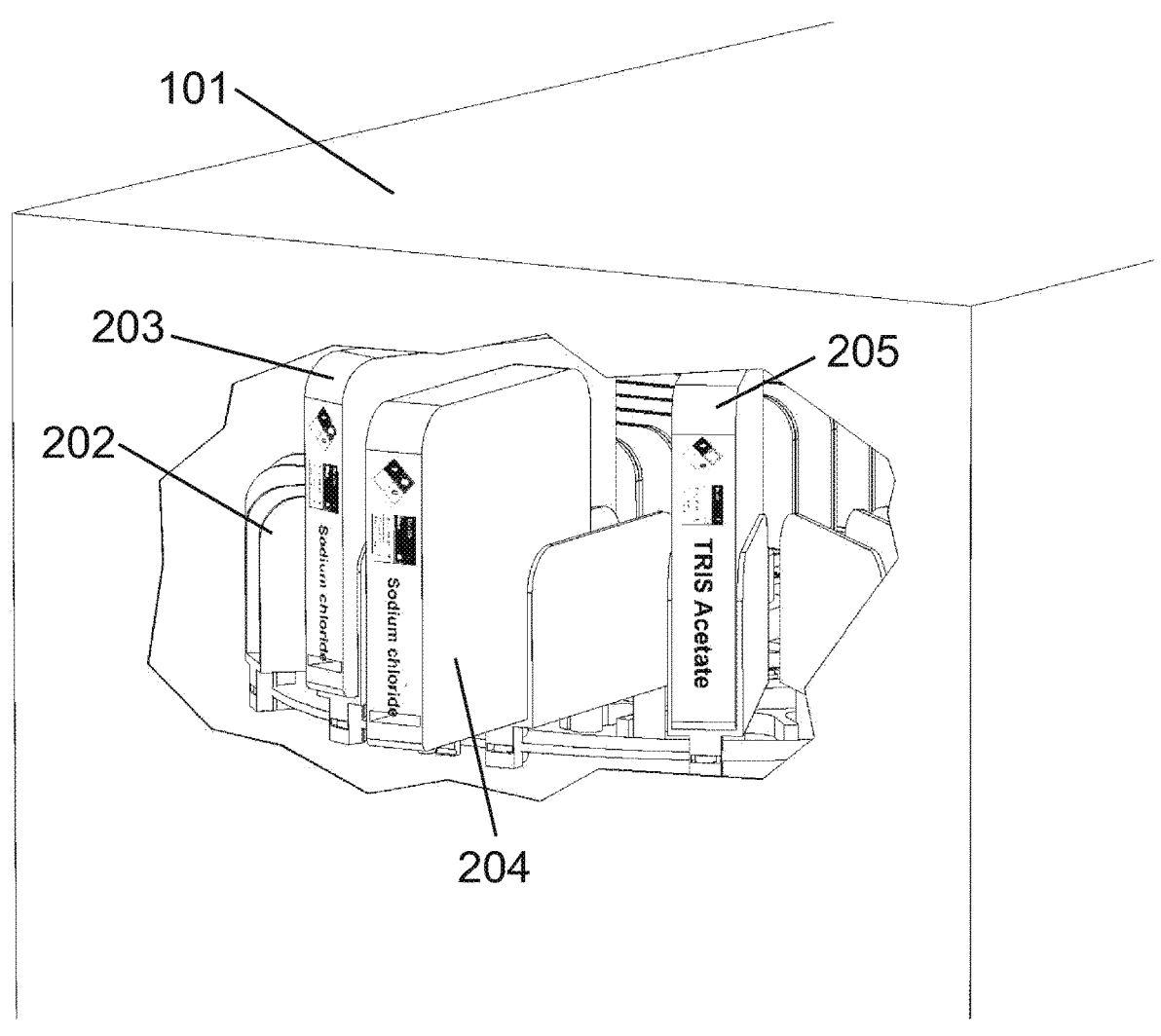
FIG. 2A is a cutaway view of a portion of the present invention showing a reagent cartridges in a carriage through a cutaway window on the left side of the dispensing device.
Figure 2B:
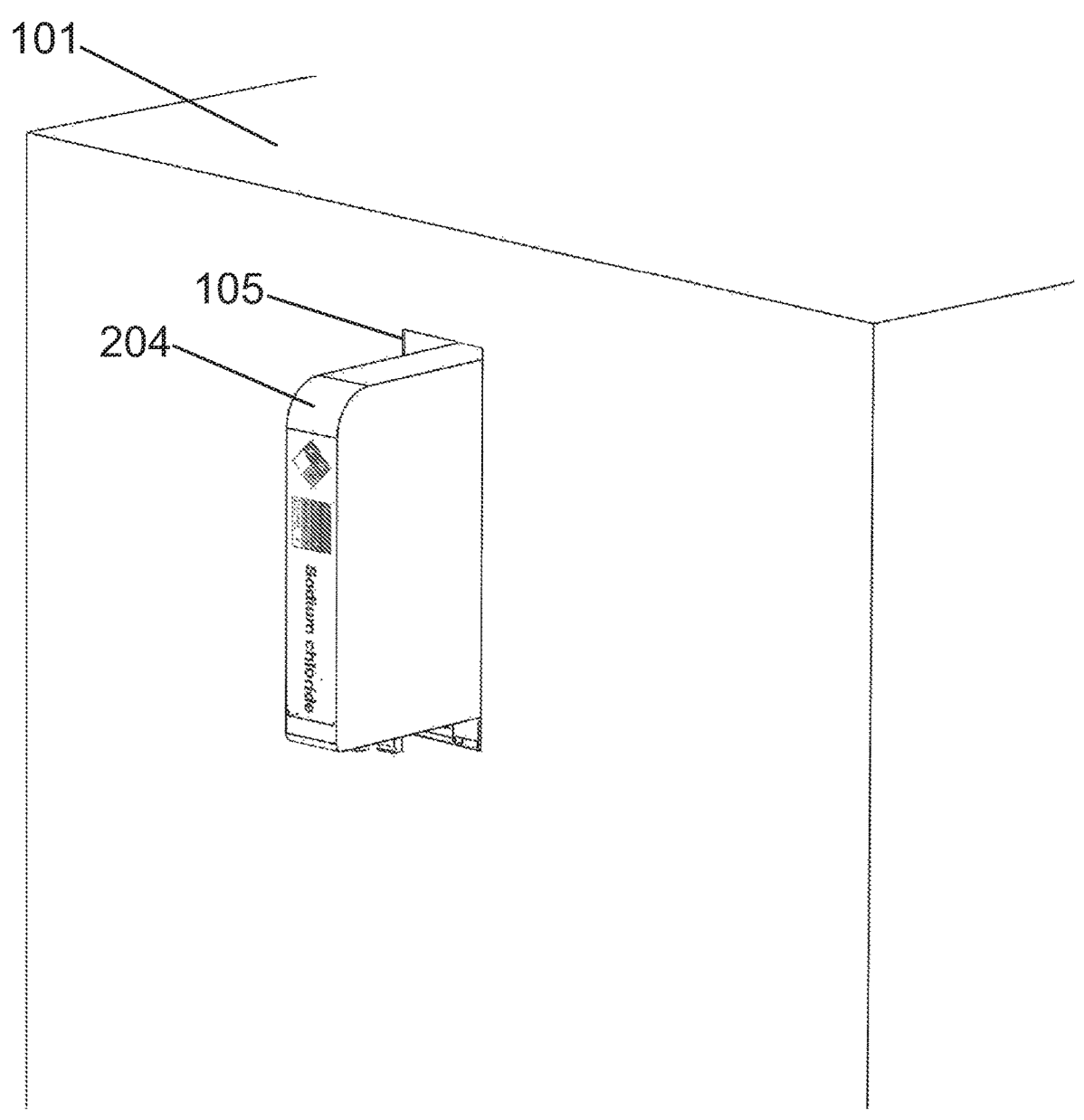
FIG. 2B is a view of a reagent cartridge protruding through a cartridge loading port of the dispensing device.

In FIG. 2A a cartridge, 204, partway inserted, is shown in one of a plurality of carousel carriages. Adjacent carriage 202 is numbered in the figure. Shown in FIG. 2B, a cartridge access port 105 in cabinet 101 allows access to insert or remove cartridges when the carousel positions the appropriate carriage at the port. Preferably, a secured access door, not shown, covers the port and prevents unauthorized access; it can be opened by the control system when a cartridge needs to be removed or inserted. In FIG. 2A, cartridge 204 and an adjacent duplicate cartridge 203 to its left are shown and are each filled with an identical reagent as required by the preferred Duplicate Cartridge Protocol to prevent the possibility of any reagents being exhausted during formulation. Cartridge 205 contains a different reagent and may be nearly full. Though it's duplicate recently ran out, the lab can still make every formulation while they wait for delivery of a new duplicate.

Ensured Availability of Each Reagent

The Duplicate Cartridge Protocol comprises a loading procedure, combined with an algorithm in the computer control system, to assure restocking of the dispensing apparatus before the supply of any reagent is exhausted while allowing for zero wastage of reagents. The algorithm draws the reagent supply from a first cartridge until it is completely exhausted. The algorithm then draws the reagent supply from a second cartridge of identical reagent and the algorithm notifies personnel of the need for restocking. This duplicate cartridge protocol makes a cartridge based machine practical.

The Duplicate Cartridge Protocol is a method for ensuring that the machine never runs out of a needed reagent. At least two cartridges of each reagent are typically installed in the machine. When the first of these cartridges is exhausted, the user and/or administrator and/or chemical vending supplier is notified by the machine, and formulation proceeds using a secondary cartridge. After formulation completes, the user and/or administrator is invited to replace the spent cartridge if a replacement is on hand. If they agree, the spent cartridge is removed by the user from cartridge access port 105 (for possible recycling), and a replacement cartridge can then be inserted. If no replacement cartridge is on hand, a new one can be ordered by the user and/or the administrator, and/or by the machine itself (via a communication protocol, for example TCP/IP protocol, which can operate over any distance, and/or Cellular 1G, 2G, 3G, 4G, or 5G protocol) (the published specifications of these communication protocols are hereby incorporated in their entirety) so that it will arrive before the secondary cartridge is spent. For popular substances, or those whose absence would be unwise to allow, more than one duplicate cartridge can be employed.

A control system, for example, based on a computer running a Linux-based operating system, is interfaced to a touchscreen, mag stripe, RFID, or chip reader, as well as the motors, solenoids, pumps, and sensors of the present invention by methods and interface protocols known to those versed in the art of digital communication. For example, these components could have wired I2C, RS-232, or USB interfaces or wireless Bluetooth interfaces. Protocols for these interfaces were published by Philips Semiconductor (now NXP Semiconductors), Electronic Industries Association (EIA), the USB Implementers Forum, and Bluetooth Special Interest Group, respectively, and all of these protocols are hereby incorporated by reference. A small single-board computer such as the Raspberry-Pi is well suited. The Raspberry-Pi User Guide by Upton and Halfacree (2012 and updates through 2018) detail its specifications and operation, and is hereby incorporated by reference in its entirety. The computer uses software which, among other things, interfaces with the user and directs the formulation process. The computer is preferably provided with network connectivity for included software disposed for remote monitoring, formulation authorization, and to request replacement reagents from the device administrator and/or reagent vendor as need. Of course other software, computers, operating systems, and communication protocols may be substituted and still provide a control system for the present invention.

It is preferred for the user-interface hardware and software to be efficient and powerful to save time and add pleasure to the user's experience. Here a preferred hierarchical tree/set of choices and flow appropriate for use by molecular biologists is shown:

The following steps in the following order represent an efficient method for a user to get the desired formulations from the present invention. Each of these steps can be presented to the user and feedback can be obtained from the user as needed, for example on a touchscreen and/or audibly.

1. In case the device is found in a questionable state (for example the device is in-process with an order, or dirty, and the previous user is not present), the new user can ask to see the last users(s) of machine, so that they can be contacted.

2. The new user provides identification/logs in.

3. User chooses one of these options to find or input the desired formulation:

recent orders personal database lab database master database custom-formulation

4. From the further choices elicited by the option chosen above, the user can narrow the choices through an incremental search by inputting characters (for example "TE", a common abbreviation for TRIS+EDTA, abbreviations known by those skilled in the art of molecular biology).

5. User selects a specific substance or a stored formulation

6. User edits or adds any needed parameters to step 5 (and optionally adds additional components: UI goes back to step 3)

7. User specifies the volume of the desired formulation that is needed

8. [Optionally the interface displays the amounts of each reagent needed vs. the total amount on hand, and/or the cost or each reagent used in the desired formulation and appropriate warnings]

9. User approves order

10. User is instructed to insert a vessel to receive the formulation and close the filling chamber door 11. Sensors and/or machine vision (see "Handbook of Machine Vision" by Alexander Hornberg, which is hereby incorporated by reference in its entirety, but a focus is on page 757) confirm appropriate positions of the vessel and the door. If appropriate positions cannot be confirmed by the device, optionally, the user is given the opportunity to override the "error state". This would allow the user to employ a vessel that doesn't fit in the filling chamber.

12. User hits "Go"

13. User can observe the formulation process via the UI screen textually and/or visually and/or directly through clear portions of the enclosure, or through a possibly clear enclosure.

14. [During the formulation process, user may optionally input and queue more orders]

15. User opens filling chamber door, removes order, and applies custom-printed label 16. User acknowledges receipt of order 17. User approves the machine to run its cleaning cycle or overrides it 18. [Optionally user may continue with any queued orders, add a new order, and is informed if any reagent cartridge was exhausted during the formulation and given the option to replace it with a new one]

19. User logs out (preferably after a mandatory final cleaning)

Figure 6:
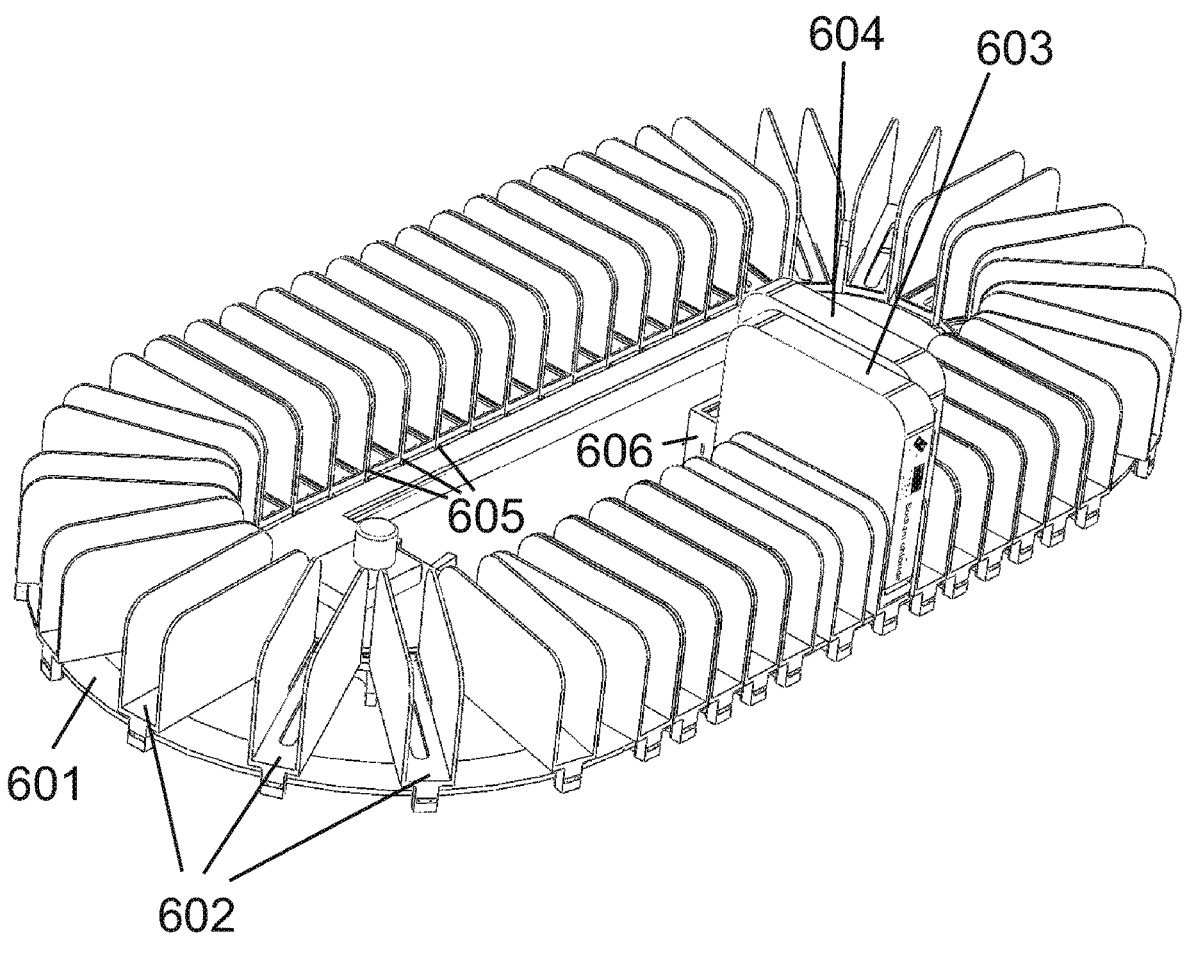
FIG. 6 is a perspective view of the topside of a racetrack-shaped carriage track cartridge positioning assembly in accordance to the present invention, shown with two cartridges with their backs toward the viewer.
Figure 10:
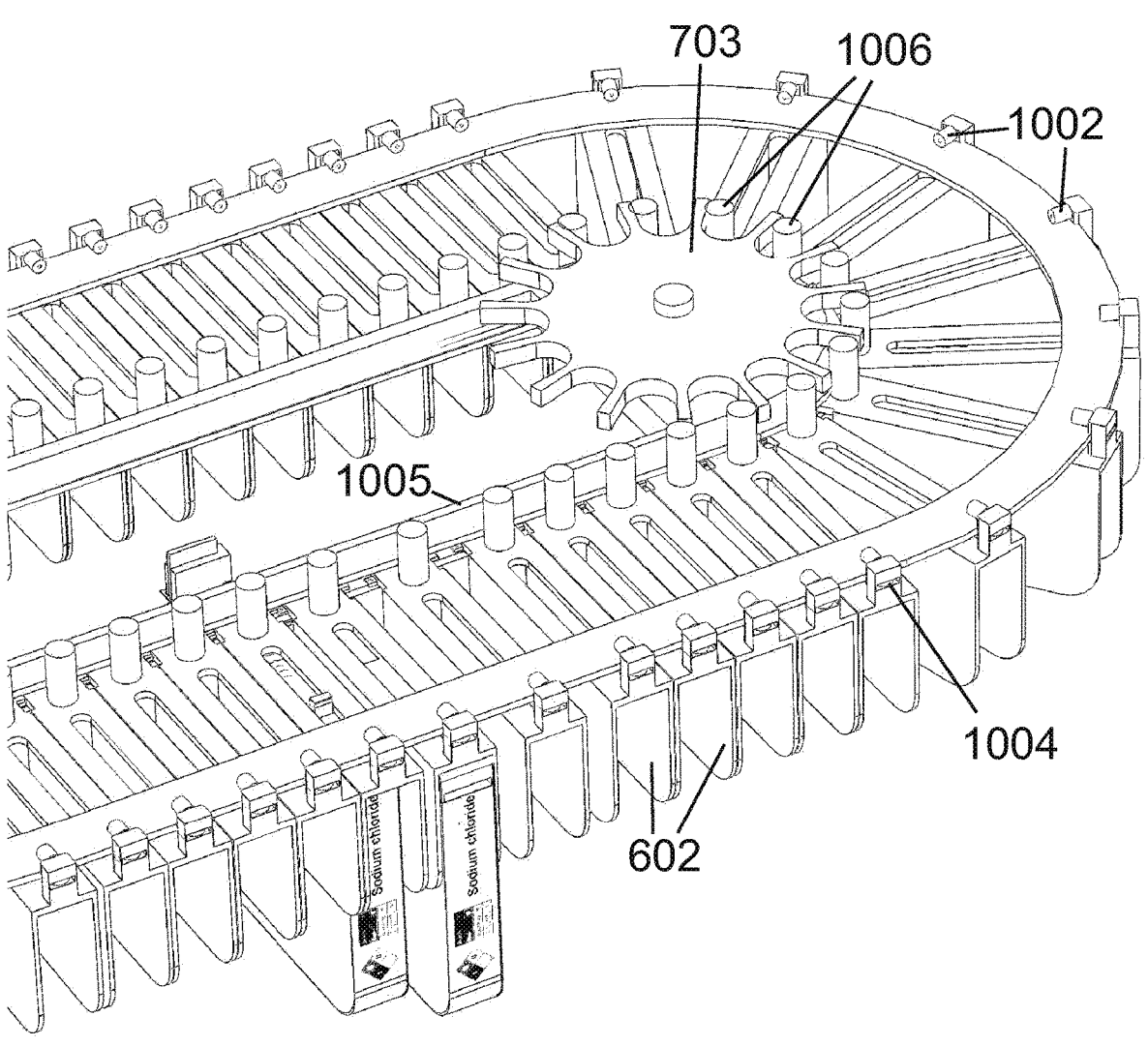
FIG. 10 is a perspective view of a portion of the underside of a racetrack-shaped carriage track cartridge positioning assembly with cog and cog pins shown, in accordance to the present invention.

A preferred racetrack shaped carousel, shown in FIG. 6, provides storage for all cartridges (such as cartridge 603) in carriage elements (such as 602), there being a plurality of such carriage elements from approximately 40 to 60, providing storage for 20 to 30 unique reagents while adhering to the Duplicate Cartridge Protocol. Carriage track 601 is preferably constructed of hardened steel or another hard material to prevent wear. Carriages 602 are preferably manufactured from sheet steel and equipped with acetyl rollers, or the like, such as shown in FIGS. 10, 1004 and 1002, to retain them on the track. Carriages are pivotally connected together by links such as 605 allowing them to move around the track like links on a chain. During the formulation process, cartridges containing needed substances are transported by motion of the carriage around the track to a blister punching apparatus 606 to effect release of reagents into the mixing/portioning chamber (or, optionally, directly to the output port). Preferably, the embodiment contains at least two of punching apparatus 606 units, distributed to maximally spaced locations around the track. This permits more rapid formulation by reducing transit time of a particular cartridge to the nearest punch and provides redundancy in case one punch module fails and is awaiting replacement. Referring to FIG. 10, the carriage elements are moved around the track by motorized cog 703 which engages cog pins 1006 resulting in a motion similar to a tank track. The chain end of the carriage elements are stabilized by rail system 1005.

Figure 11:
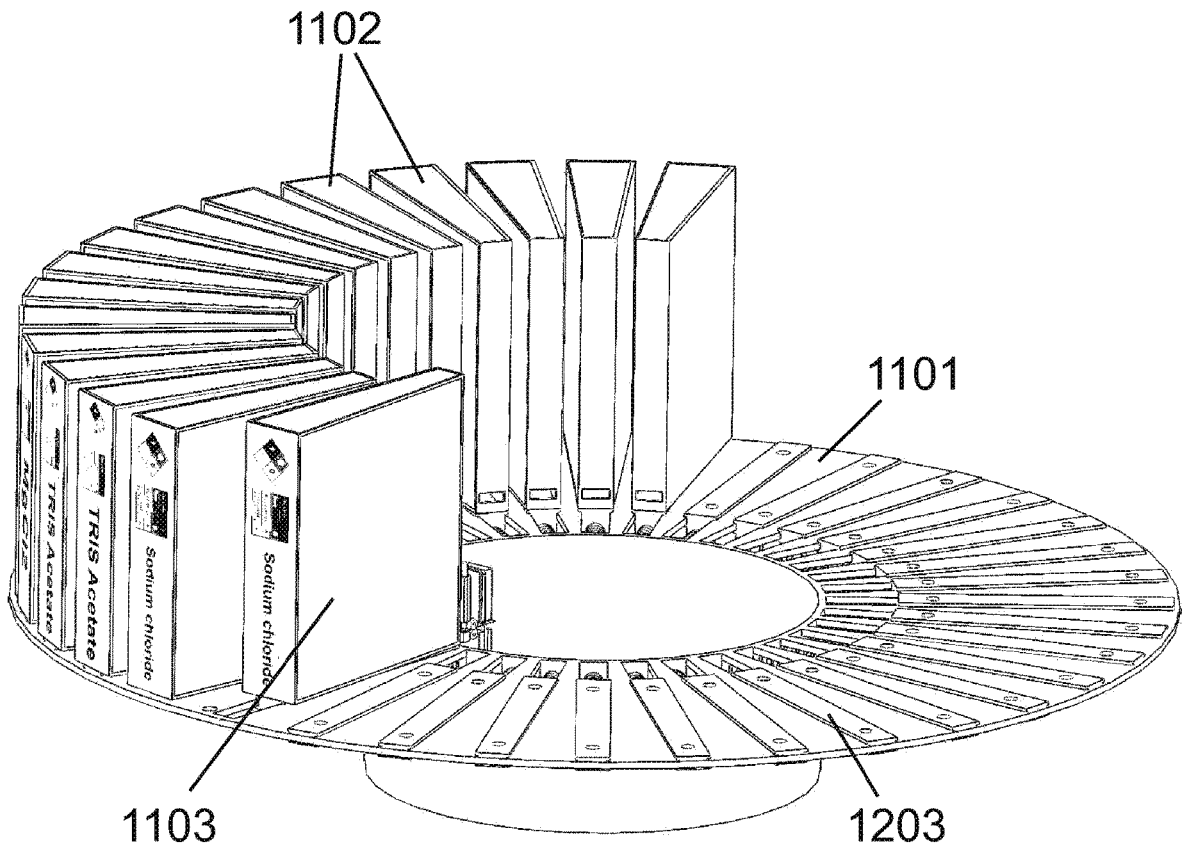
FIG. 11 is a perspective view of the topside of a circularly-shaped carriage track cartridge positioning assembly partially populated with reagent cartridges, in accordance to the present invention.

As an alternative to a racetrack-shaped track with linked cartridge elements rotating around it, a rotating circular carousel baseplate, 1101, equipped with cassette carriages 1203, inactive cartridges 1102, and in-use cartridge 1103 is shown in FIG. 11. In this embodiment the carousel baseplate rotates so as to position the desired cartridge so that its reel blister can be pulled into the punch assembly by the punch assembly rollers. Circular carousel baseplate 1101 has a plurality of rectangular openings (such as 1401 shown in FIG. 14) in which cassette carriages, such as 1203 in FIG. 12, are captured except for freedom to slide radially toward or away from the center.

Figure 12:
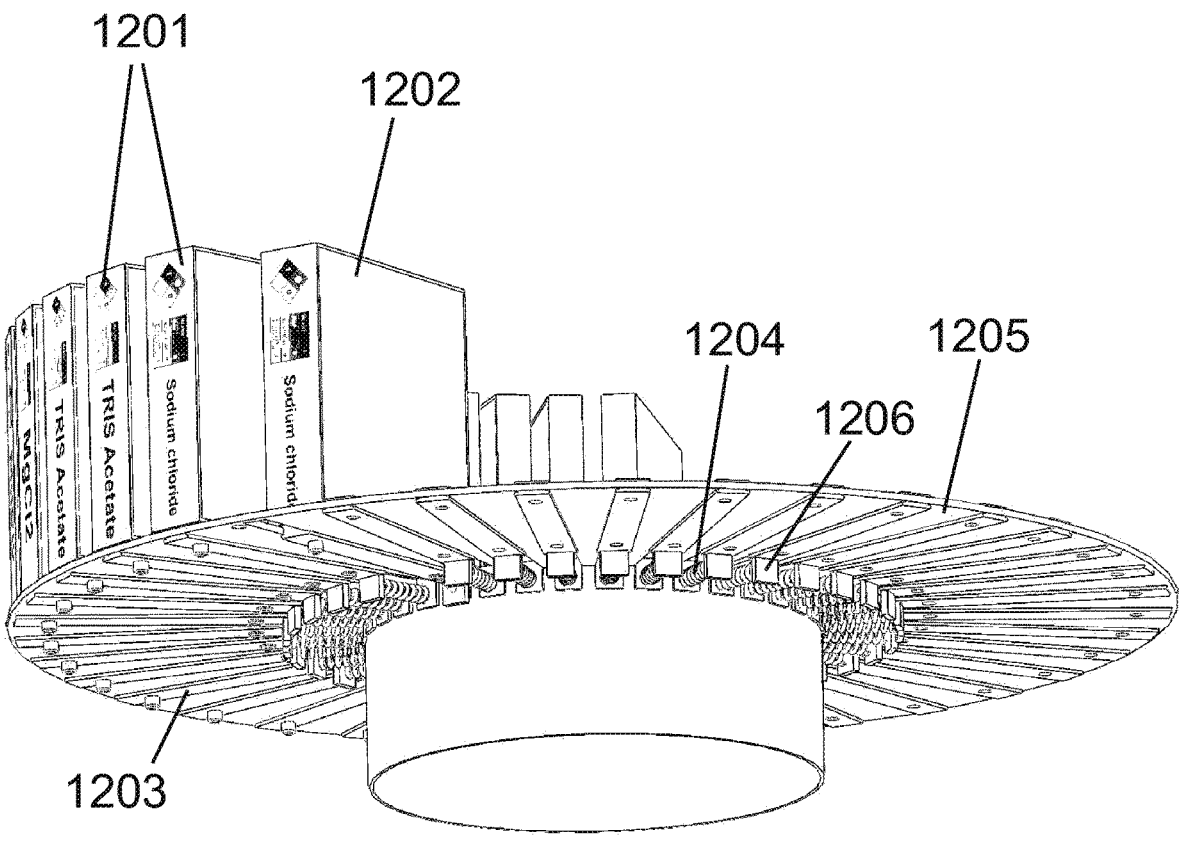
FIG. 12 is a perspective view of the underside of a circularly-shaped carriage track cartridge positioning assembly partially populated with reagent cartridges, in accordance to the present invention.

FIG. 12 shows a view of a circular carousel with cartridges such as 1201 and 1202 as seen slightly below the midline of carousel baseplate 1205 also shown in FIG. 11, 1101 from above the midline. A plurality of springs such as 1204 urge the plurality of chemical cartridge carriages away from the center. A motorized linear actuator, such as Trossen Robotics IR-D12-12PT-3, is disposed so as to be able to apply force to tab 1206 to force cassette carriages 1203 radially inward, overcoming spring 1204. Trossen Robotics' related documentation and specifications are hereby incorporated by reference in their entirety. This motion allows the cartridge to be positioned so that the blister strip (not visible in this view) protruding from cartridge 1202 can be engaged by rollers 904 and 905 shown in FIG. 9 or the cog wheel 1500 shown in FIG. 15.

Figure 14:
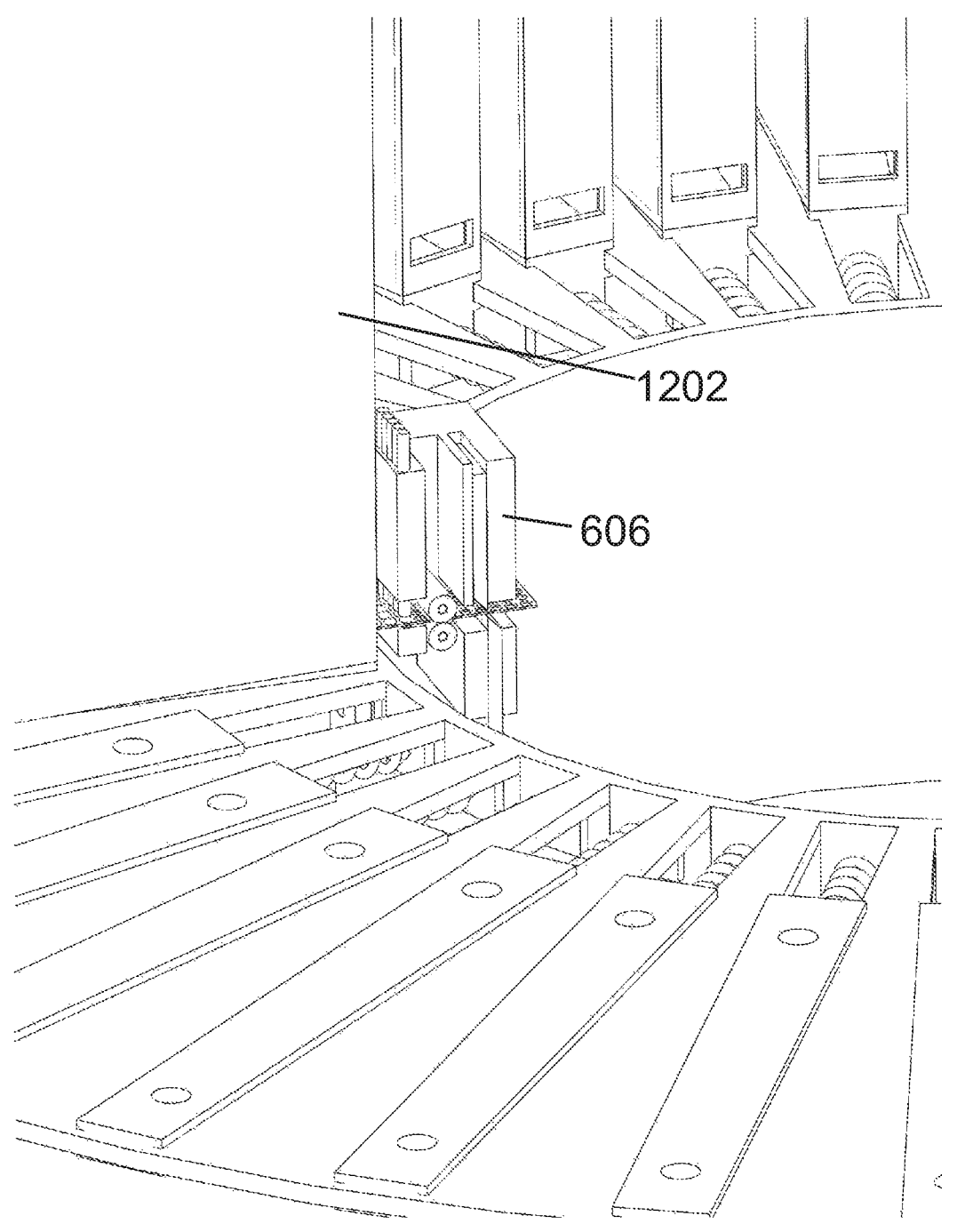
FIG. 14 is a perspective view of a portion of the topside of a circularly-shaped carriage track cartridge positioning assembly including an engaged external blister punch block assembly, in accordance to the present invention.

FIG. 14 shows cartridge 1202 positioned radially inward with its associated blister engaged in blister punching apparatus 606. Punched blisters are not shown in this figure, but in fact are still present though crushed, and blister cell cover is still present but burst.

A stepper motor of sufficient torque and angular resolution is chosen to drive cog gear 703 to overcome friction and provide position accuracy of approximately 0.1 millimeter. It should be understood that, while the carriage movement systems are shown in the drawings to be horizontally disposed, an embodiment where the carriage movement systems are vertically disposed may be preferable for including more reagent cartridges, depending on the particular dimensions of the enclosure.

An in-use cartridge such as 604, one from which chemicals are being taken, is positioned at the punching apparatus 606. Details of a preferred punching apparatus are showing in FIG. 9. In order for rollers 905 and 904 to engage the blister strip, 701, and position the blisters beneath the punches, 902, roller 904 is rotatable bidirectionally by a motor, such as a stepper motor, not shown, and optical feedback from the blisters provides information for accurate positioning by an algorithm in the control system computer. The normal direction of drive, 901, is the direction of travel which unrolls the blister strip from its associated reel.

Figure 15:
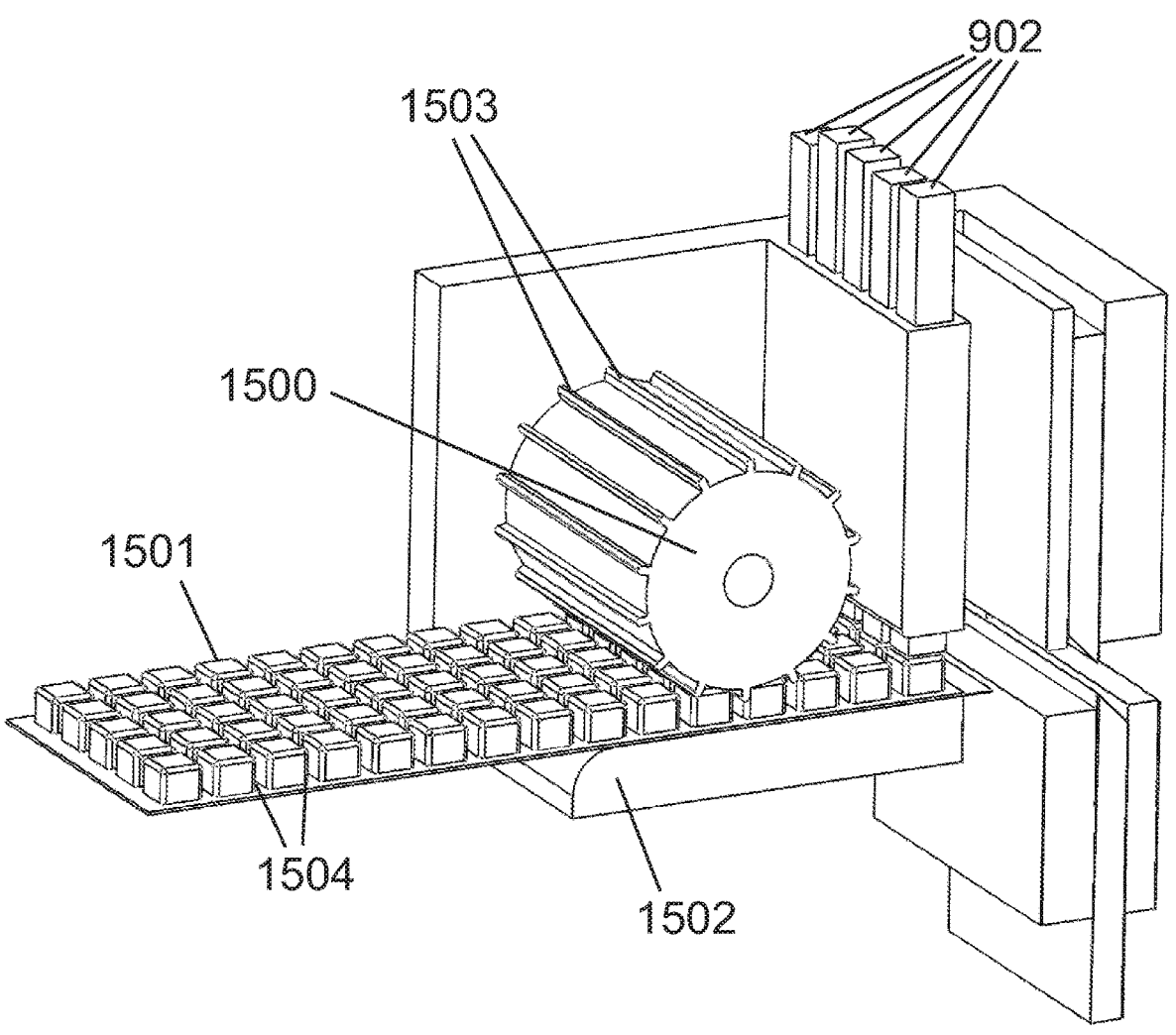
FIG. 15 is a perspective view of an alternate preferred blister-pack punch and waste trimming assembly with a sprocket drive tractor feed mechanism in accordance to the present invention.

An alternative to the pinch roller drive system is shown in FIG. 15, where the blister strip, 1501, supported by support 1502, can be driven by sprocket, 1500. The sprocket teeth, 1503, engage in the space between blister rows 1504. The pitch of the sprocket teeth match the pitch of the blister rows.

High packing density of reagents is preferred to minimize the need to order and change cartridges. The sprocket system disclosed above eliminates the needs for extra width needed for sprocket holes. The roller system described above does this plus eliminates the need for any extra space between blisters. These improvements over prior art allow for a packing densities over 75%.

Figure 8:
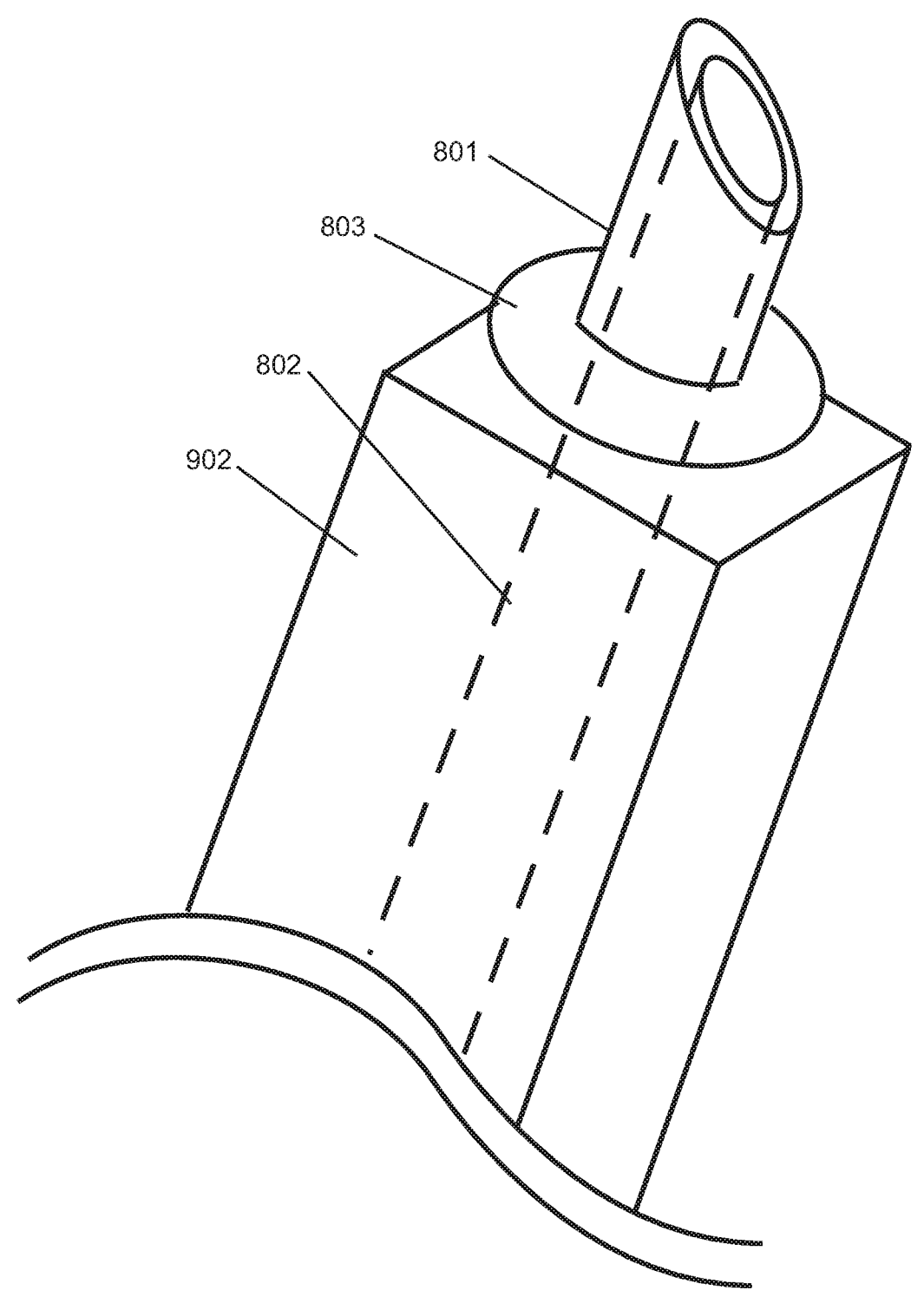
FIG. 8 is a perspective view showing a type of blister punch, which may be used in the punch assembly shown in FIG. 9, that pierces and injects a pressurized fluid to dispense the contents of a blister in accordance to the present invention.
Figure 9:
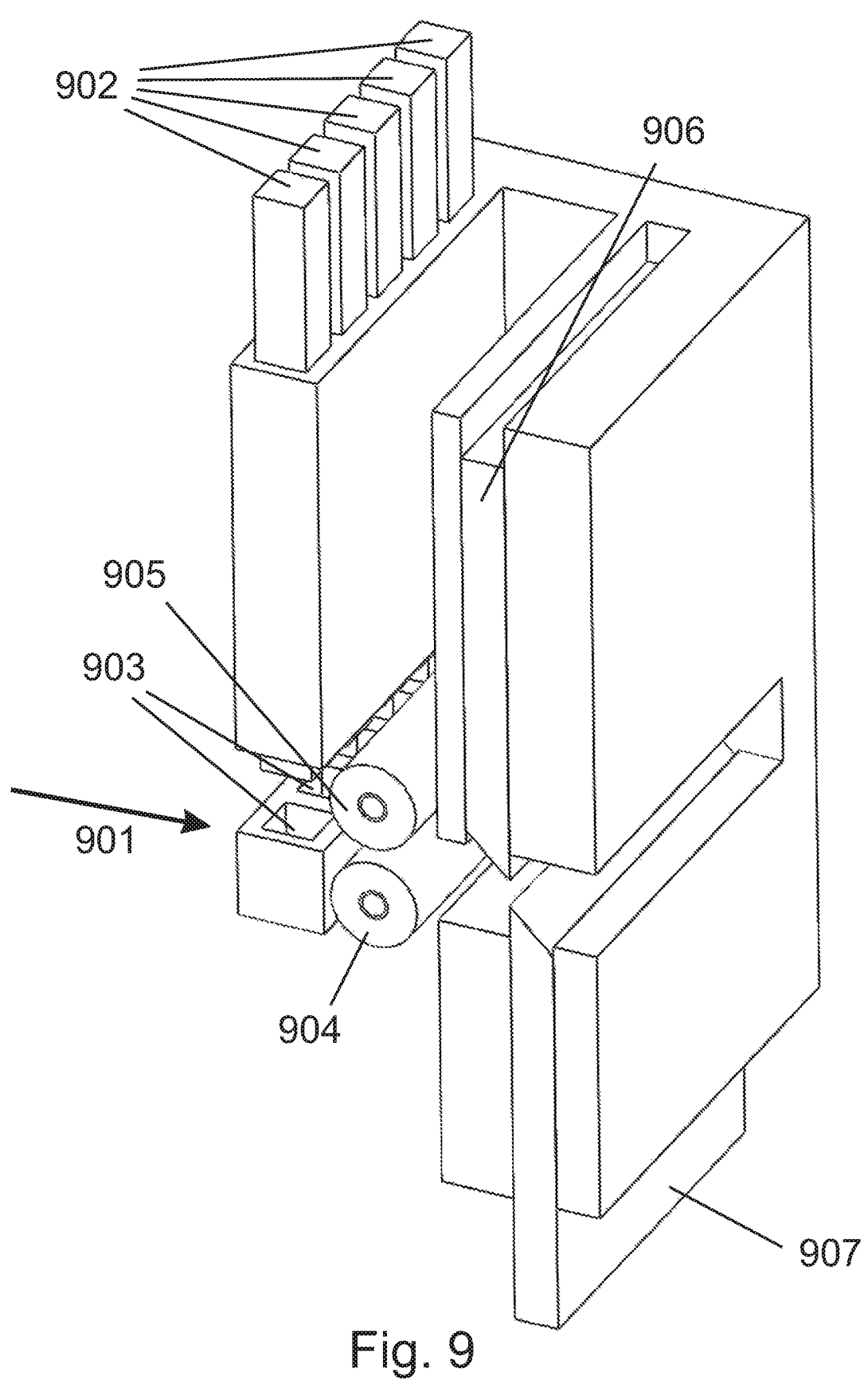
FIG. 9 is a perspective view of a blister-pack punch and waste trimming assembly with punches, dies, rollers and blades shown.

Optical feedback sensing by transmissive LED/Optotransistor sensors is well known by those versed in the art of motion control. Alternatively, positioning could be performed by or in combination with machine vision as per "Handbook of Machine Vision" by Alexander Hornberg, copyright 2006 Wiley-VCH Verlag GmbH & Co KGaA, Weinheim. The exhausted end of a blister reel is cut off by guillotine blades 906 and 907 which are activated by electromechanical solenoids, well known to those versed in the art of motion control. Punches 902 can also be activated by solenoids. Punches and guillotine blades are all provided with retraction springs, not shown, which keep the guillotine blades apart, and which keep the punches clear of dies 903 when the solenoids are inactive. In the case of simple punches such as 902, the punch itself compresses a blister, forcing the reagent to exert pressure on the blister cover until the cover bursts, releasing the blister's contents. FIG. 8 shows an alternate preferred punch design where a sharp hollow needle, 801, is punched into the blister. O-ring 803 provides a pressure-tight seal against the blister and a fluid, such as water or a gas is injected into the blister via passage 802 that goes through each punch 902. The resulting fluid pressure against the reagents and the blister cover bursts the cover and expels the blister's contents.

Alternatively and preferably with respect to built-in positioning, a roller takes the form of sprocket, matching the pitch of the blister strip, and propels the strip in the manner of a sprocket and chain as shown in FIG. 15. This maximizes the packing density of the blister strip. In this embodiment the rollers precede the punches and engage the unpunched blisters of the reel. Alternatively, sprocket teeth can engage holes or other features in the blister strip provided for that purpose.

After necessary reagents have been dispensed from a strip, or as needed, guillotine blades 906 and 907 cut the portion of the strip past the blades, whereupon the exhausted portion falls into a waste disposal container, not shown. A record of the punched blisters is recorded into the RFID's and/or the control computer's memory. For example if the blister tray is five blisters wide and only one of the five has been punched, this allows the device to know that the next available blister is in position two. Machine vision can confirm correct operation.

Figure 13:
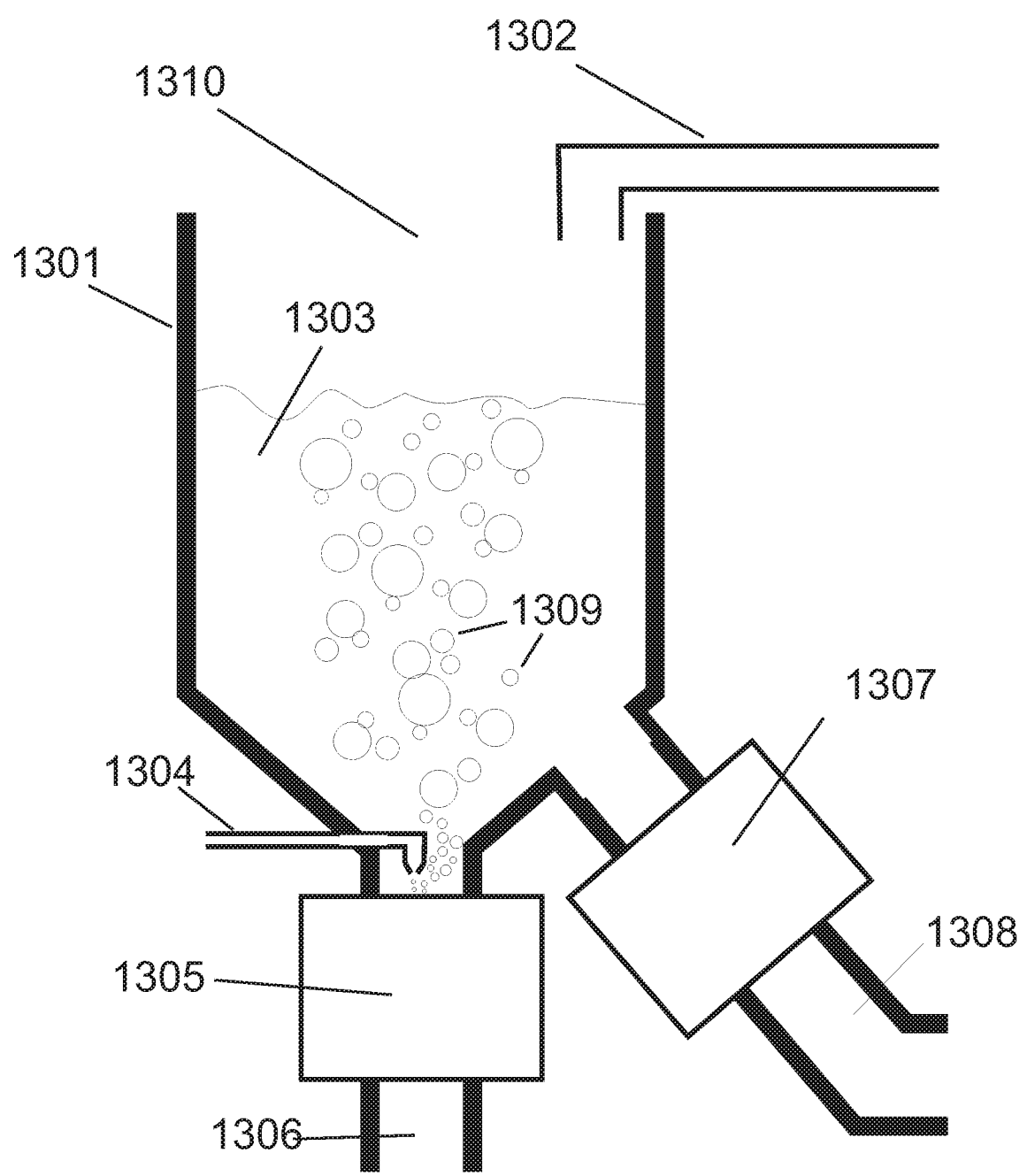
FIG. 13 is a sectional schematic view of a mixing chamber with some associated components for mixing and portioning reagents in accordance to the present invention.

The one or more punching apparati are positioned such that their output ejects into the mixing/portioning chamber, that is cross-sectionally shown in FIG. 13. Solid chemicals ejected from a punched blister are propelled, by some combination of inertia, the action of gravity, and electrostatic force, preferably through a funnel, into the chamber.

Based on having two punch mechanisms any cartridge in the carousel can be identified and engaged in a punch mechanism in less than five seconds. Punching time can be less than 0.1 seconds per row.

Many substances, such as powders and liquids can be attracted by electrostatic charges. The preferred embodiment takes advantage of this principle to manage the dispensing process. By using a small high-voltage generator to ionize a gas such as air, it is possible to selectively generate or neutralize an electro-static charge by techniques commonly understood by those familiar with the art of electrostatics (examples are shown by following this youtube link: www.youtube.com/watch?v=P5za9sa4-qk) and are hereby incorporated by reference in their entirety.

While many uses relate to mixing solid reagents into water (or another liquid), it is to be understood that the invention works perfectly for liquid reagents as well. For example, for molecular biology formulations, the system can deliver quanta of beta-mercaptoethanol, dithiothreitol, liquid detergents, methanol, ethanol, chloroform, acetic acid, trichloroacetic acid, HCl, etc.

The blister-pack system has many virtues, including the ones stated in this application, but there are other highly useful embodiments of this invention of using pre-portioned small quanta of reagents. For examples, reagents can be made into pill form where each pill (quanta) has a known dosage of the reagent, with the "pills" loaded into a cartridge, otherwise encapsulated, or cartridges of powder can include a measuring scoop system or measuring screw system and deliver known quanta of reagents in that way while not require any weighing.

Mixing/Portioning/Dissolving

In one embodiment the mixing/portioning chamber is equipped with an air bubble injection port for mixing the contents of the chamber. In another embodiment the chamber is equipped with a magnetic stirring bar for mixing the contents of the chamber. In another embodiment the portioning chamber is equipped with a stirring bar mounted directly to a motor for mixing the contents of the chamber. In still another embodiment, mixing is realized by vibratory means, for example sonication. In another embodiment, means for heating the liquid mixture occupying the portioning chamber is provided by electrical resistive heating, microwave heating, sonication heating, or other means well known to those versed in the art heating methodologies.

Referring to FIG. 13, the quanta of chemicals are suspended into liquid that is introduced to the top opening, 1310, of the chamber body, 1301, via a metering pump/metering valve through water inlet 1302, by the action of 1304 which could represent a sonication horn, an air-jet with consequent bubbles, 1309, or any system known to generate cavitation. Desired quantities of liquid solution/suspension, 1303 are directed into the collection container port, 1306, by metering pump 1305, or directed to waste disposal port 1308, by metering pump 1307, which are either piston pumps and/or peristaltic pumps, well known to those versed in the state of the art of fluid handling. This allows for extremely high precision formulation because a single quanta of reagent can be suspended in the chamber, and any chosen portion of that quanta can be added to the formulation.

Water Quality Options

In one embodiment, the water utilized by the machine is supplied in a purified state and requires no additional purification. In other embodiments, a purification module is placed in line, with water supply port 102. Water purification may be by means including but not limited to: distillation, deionization, reverse osmosis, activated carbon filtration, microporous filtration, ultrafiltration, ultraviolet oxidation, electrodialysis and others well known to those versed in the art of water purification.

The preferred embodiment includes an optional sterilization system so that the user can choose to have the formulation delivered to the vessel in sterile form. The invention can sterilize the formulation by heat, ultraviolet light, and/or filter sterilization via a vacuum flask positioned just before the output dispensing tube. Filtration necessitates that solutes are fully in solution at the time of filtration, not merely suspended.

One or more video cameras positioned to allow observation of the workings of the mechanism are interfaced to the control computer to allow observation by the user, maintenance personnel, and to enable logging for maintenance purposes. This is preferred so that the user can be confident that all aspects of the formulation process proceeded without error. Alternatively, some or all of the enclosure can be clear for direct observation.

Typical Operation of the Invention

Extremely Rapid Formulation at Desired pH

A system that can deliver known quanta/dosage of chemicals provides an impressive new level of speed when it comes to formulation. A system that can deliver a formulation in 60 seconds or less at an accuracy of better than 5.1% is useful for most laboratory applications. 60 seconds is a short enough time for a person to wait for a formulation without undue tedium thereby obviating the need for an automated order handling queue and is likely to be at least ten times faster than manual formulation. Manual formulation commonly used in laboratories requires weighing of reagents and measuring of liquids. The combination of errors inherent in those two steps commonly results in an accuracy of +−5%.

With the present invention, any reagent can be ejected in a close approximation of the desired quantity almost instantaneously. Furthermore, the current invention facilitates a superior methodology as compared with titration to achieve an accurate pH of the formulations automatically. Many of the common pH buffering systems, which are well known to biologists, are available in two forms. For example there is the 2-Amino-2-(hydroxymethyl)-1,3-propanediol also called Tris(hydroxymethyl)aminomethane also called "TRIS" buffer system. TRIS Hydrochloride (TRIS-HCl) is an acidic form and TRIS Base (TRIS-OH) is an alkaline form and both of these forms are readily available. In traditional formulations, the user chooses one of these two related pH-buffering reagents in a particular quantity and then manually adjusts the pH by adding a strong acid such as hydrochloric acid to TRIS-OH, or a strong base compatible with the formulation such as sodium hydroxide or potassium hydroxide to TRIS-HCl, in order to adjust the pH to the desired level. This pH adjustment requires a significant amount of time because the reagents need to be fully dissolved first, and then the reagents used to adjust the pH need to be added in small quantities, dropwise, with pH measurements taken each time, painstakingly, until the desired final pH has been achieved. In the current invention, since the quantities of each chemical are known accurately, it is possible to combine both versions of the pH buffering system in dry form in order to achieve the correct pH instantaneously. An example of this can be seen below. This example uses TRIS-HCl plus TRIS-OH, but similar results can be achieved in other pH buffering systems, for example by using sodium phosphate monobasic plus sodium phosphate dibasic, types of sodium carbonate, or types of 4-(2-hydroxyethyl)-1-piperazineethanesulfonic acid (HEPES).

Example: Rapid Formulation of 20 Millimolar TRIS pH 7.5

To help illustrate the features of the preferred embodiment method and device, here is an example of how the system could be used by a user such as a research biologist. Here, the user orders 100 ml of 20 mM TRIS pH 7.5 (a solution formulated to act as a pH buffer in various possible biology experiments). The user starts by identifying himself with an ID card or name and password to gain access to the system and previously stored formulations. The user then selects the desired formulation from a menu or specifies it manually and also selects the desired quantity and the desired pH. After the user selects 20 mM TRIS pH 7.5 and a quantity of 100 ml, the machine calculates the reagents and the quantities of each needed to fulfill the order: In this case, based on the Formula Weight of 121.14 for TRIS-OH and 157.6 for TRIS HCl and the Henderson-Hasselbalch equation, The following published data (Sigma-Aldrich Co., 1996) can be derived:

| Tris Buffer Preparation Table-pH at 25° C. | | |
|---|---|---|
| | g/L of TRIS type for 0.05 Molar Solution | |
| pH | HCL | Base |
| 7.20 | 7.02 | 0.67 |
| 7.30 | 6.85 | 0.80 |
| 7.40 | 6.61 | 0.97 |
| 7.50 | 6.35 | 1.18 |
| 7.60 | 6.06 | 1.39 |
| 7.70 | 5.72 | 1.66 |
| 7.80 | 5.32 | 1.97 |
| 7.90 | 4.88 | 2.30 |
| 8.00 | 4.44 | 2.65 |
| 8.10 | 4.02 | 2.97 |
| 8.20 | 3.54 | 3.34 |

Based on the such a lookup table the control system can calculate that for 20 mm TRIS pH 7.5 we will need:

(6.35 g×20 mM×100 ml)/(50 mM×1000 ml/L)=0.254 g (254 mg) of TRIS-HCl and (1.18 g×20 mM×100 ml)/(50 mM×1000 ml/L)=0.047 g (47 mg) of TRIS-OH and 100 ml of H2O.

The system next confirms that sufficient reagents are available in the current complement of cartridges to fulfill the order and alerts the user if insufficient quantities are available. The user then removes the cap from a bottle and places the bottle in the machine and positions the fill tube over the mouth of the bottle. The user touches a start icon on the User Interface screen to begin production of the formulation order. Machine vision confirms the presence and proper positioning of a bottle before dispensing. In some embodiments a user can override an "appropriate-bottle-not-detected" error and command the system to dispense regardless.

The machine maintains and updates an internal database that contains inventories of the amounts of reagents and their positions in the movable reagent cartridge carriage. In this example, each blister contains 133 mg of powdered reagent. By dividing the amounts needed by 133 mg, in this case, the system determines that 1.9 blisters of TRIS-HCl, and 35 blisters of TRIS-OH are required. Next, the TRIS-HCl cartridge is positioned ready to be punched into the mixing/portioning chamber, then the machine uses an RFID reader to read the RFID tag on the cartridge, confirms the database inventory and punches 1 blister of TRIS-HCl into the portioning chamber. 10 ml of water is placed into the portioning chamber, blended with injected air, and dispensed into the user's bottle. One way that the current invention provides greater speed of formulation than prior art because the liquid mixture is dispensed whether solution or mere suspension is achieved. One more blister of TRIS-HCl is punched out into the portioning chamber, blended with 10 ml of water, but only 9 ml of the blended liquid in the portioning chamber is dispensed into the bottle, thereby effectively using only 90% of the blister yielding a total of 1.9 blisters. The unused portion of the blend in the portioning chamber is discarded. The RFID of the TRIS-HCl cartridge is updated to reflect the 2 used blisters, the TRIS-HCl cartridge is retracted, a TRIS-OH cartridge is then positioned ready to be dispensed, and its RFID inventory is reckoned with the database. One blister of TRIS-OH is dispensed into the portioning chamber, and blended with 10 ml of water. 3.5 ml of the blend is then dispensed into the user's bottle, the remainder of the blend is discarded. The portioning chamber is then rinsed with water and the rinse water discarded. Since the total of the above volumes is 22.5 ml, 77.5 ml of water required to complete the order is then dispensed into the user's bottle to make a total liquid volume of 100 ml. In practice, correction factors to these volumes are applied to compensate for the any volume added to the liquid due to the solid in solution. As an alternative to lookup tables, the system can be supplied with equations to directly compute the needed amounts of acidic and alkaline buffer components to achieve any desired pH. Greater speed of formulation is achieved compared to prior art by adjusting pH according to a formula or lookup table rather than through a tedious feedback-based titration procedure.

The user can monitor the entire process by looking through a clear portion of the system's enclosure and/or by watching live video on the User Interface screen. In addition to the user being able to monitor the process, machine vision can monitor it as well and alert the user and an administrator in the event of any error.

The user then removes the bottle from the machine and replaces the bottle cap. A self-adhesive label describing the formulation order is printed for the user to apply to the bottle. The label may also contain the user's name, the date of the formulation, and any other appropriate information, such as cautions. Additional copies of the label can be printed, for example one for the user's lab notebook. Preferably a secondary label printer is provided so that labels can continue to be printed even if one modular printer needs replenishment or replacement.

If the user has additional formulations to prepare, the user's bottles can sit on the integral storage shelf before and after they are needed in the device.

Example: Safe Preparation of a Dilute Sulfuric Acid

Preferred formulation algorithms are equipped with a knowledge base for safe mixing of reagents. For example, in the case of the exothermic reaction created by mixing concentrated sulfuric acid with water, small volumes of acid are added to greater volumes of water (instead of mixing water into the concentrated acid) to prevent boiling and spattering of the caustic mixture.

A preferred recessed cavity in the machine cabinet forms a water-tight, enclosed bottle filling chamber, accessible through a door, including a horizontal grill surface equipped with liquid waste drainage for resting a vessel while it is being filled with the desired formulation, including a rinse system for cleaning the filling chamber. Preferably the door slides open in a vertical axis manually and latches open. For cleaning, a water spray rinse system, under control of the computer, preferably closes the door by releasing the latch and sprays the bottle filling chamber (including the bottle filling assembly, therein) clean after each formulation is complete, or as otherwise determined by the control system algorithm and/or the user. The door can be locked closed by the control system during cleaning to prevent user interference during the cleaning cycle.

Vessel Options

While many users will prefer the versatility and economy of a machine where they can fill their formulations into their own reusable bottles and other vessels, as shown in FIG. 1, an embodiment used in a larger facility, where users are not in close proximity to the machine, will include its own supply of bottles and a bottle handling system. In that situation, orders can be entered, queued, and monitored remotely by the user via a remote computer, tablet, smart phone, or other interface device from an arbitrary distance, via the TCP/IP protocol, which is hereby incorporated by reference in its entirety.

Self-Cleaning

After a formulation cycle, the control system monitors the bottle filling chamber via machine vision until the bottle is removed by the user. After the bottle is removed, the control system closes and locks the water tight door of the chamber. Nozzles thoroughly spray the mixing chamber, any exposed surfaces, and the filling chamber, including the inverted fill nozzle with a fine mist. Optionally, high speed air jets remove water from the surfaces of the chamber. Once this operation is complete, the control system unlocks the chamber door allowing a user to open it manually to set the next bottle in place.

Example: Restocking the Reagent Cartridges of the Invention

Figure 7:
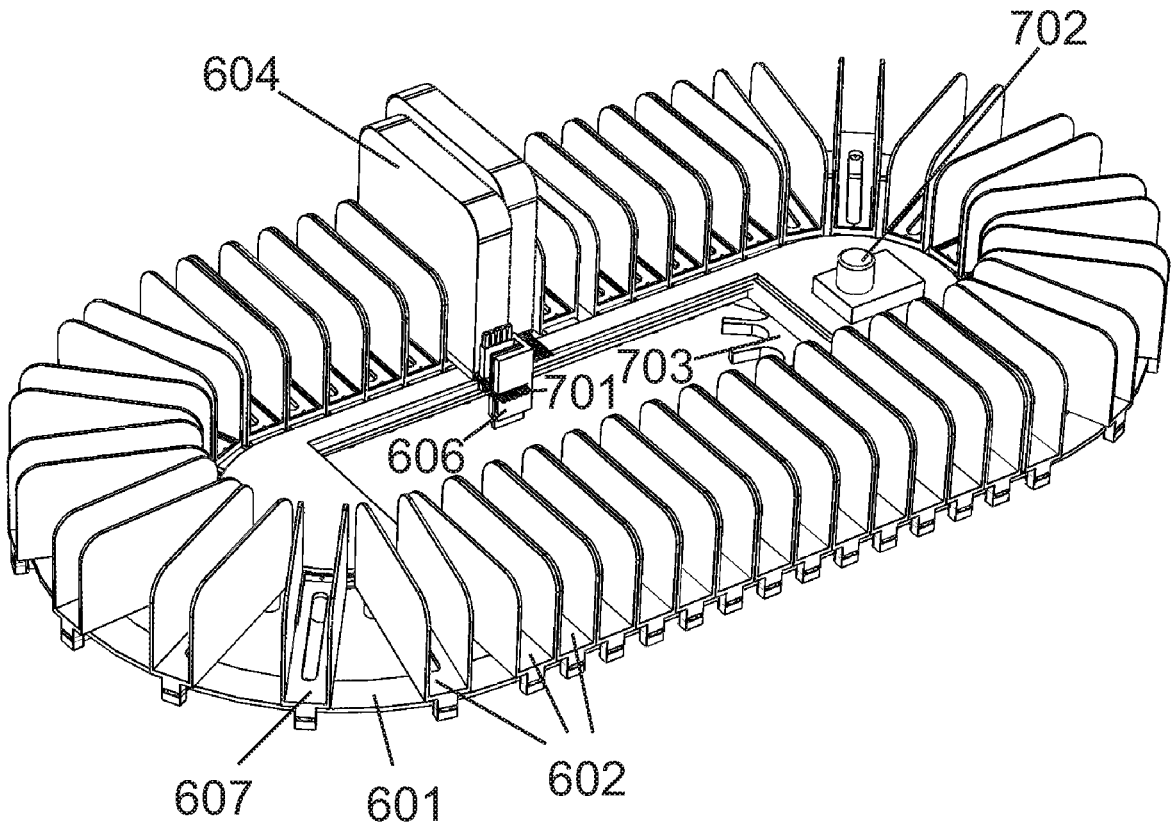
FIG. 7 is a perspective view of the topside of the same racetrack-shaped carriage track cartridge positioning assembly as shown in FIG. 6, with two cartridges with their backs away from the viewer showing an external blister punch block interacting with the engaged cartridge.

The cartridge-based design of the present invention allows it to be restocked by a user with minimal training. A Graphical User Interface presented on the interactive screen, 107 of FIG. 1, allows a user or administrator to interrogate the machine for all empty cartridges. Similarly, at the end of a formulation order, if a reagent cartridge was fully expended during that order, the GUI can ask the user if he/she would like to replace the cartridge. The user selects an icon representing the particular empty cartridge to replaced. Referring to FIG. 7, the control system computer rotates the carousel carriage elements 602 by rotating motor 702, until the empty cartridge is centered behind the cartridge port, FIG. 1, 105. The secured cover, not shown, is opened. The user pushes the cartridge forward slightly, disengaging a feature on track guide, FIG. 3, 305, tilts the cartridge forward slightly, and is then able to remove the cartridge from the carousel. The protective cover protecting the strip exit aperture is removed from the fresh cartridge to be loaded into the carousel carriage. To install the cartridge, the removal procedure is reversed. The secured cover is closed and the control system computer takes inventory of the cartridge that has been installed.

A person of ordinary skill in the art will recognize other modifications and variations including changes in the arrangement or sequence of the inventive features and operations described above. All such modifications and variations are intended to be within the scope and spirit of the present invention, as set forth in the following claims, and not limited by the particular embodiments or specific examples detailed above which are only intended to illustrate some of the variations and preferred embodiments of the present invention.

Any data present in the Claims, Drawings, Brief Description of the Drawings, Abstract, Summary of the Invention, supplied references, embedded references, and any appendices that is not present in this disclosure are hereby incorporated by reference.

This application claims priority based on of provisional application No. 62/732,593 filed Sep. 18, 2018, hereby incorporated by reference.

The invention claimed is:

1. A method of automated laboratory formulation production comprising:

a step of maintaining a plurality of cartridges wherein each cartridge contains a plurality of encapsulated or pelletized, pre-measured quanta of a particular reagent, wherein said quanta comprise individual discrete solid units in non-blister pack form, but every cartridge does not contain the same reagent;

a step of receiving a desired formulation defining a chemical composition and total volume from a user;

a step of automated computing to convert the desired formulation and volume to specific numbers of said pre-measured quanta;

a step of ejecting said specific numbers of said pre-measured quanta;

a step of mixing said specific numbers of said pre-measured quanta; and a step to produce said desired formulation devoid of a step to weigh or measure said reagents.

2. A method as in claim 1 where in said desired formulation includes at least one solid reagent and said step of mixing comprises at least one liquid.

3. A method as in claim 1 further comprising:

a step of implementing a Duplicate Cartridge Protocol by maintaining more than one of each said cartridge.

4. A method as in claim 1 further comprising:

a step of synthesizing formulation pH by computing and ejecting a computed number of quanta of pH-affecting reagents devoid of a step of pH measurement.

5. A method as in claim 1 further comprising:

a step of labeling each said cartridge with assay information as to the dosage of each of said quanta contained therein in a machine-readable format.

6. A method as in claim 1 further comprising:

a step of writing and storing updated information as to the number of remaining quanta in each said cartridge concomitant with said step of ejecting.

7. A device disposed to produce a user-specified formulation of at least one of: a liquid, a solution, a mixture, and a suspension, comprising:

a plurality of tagged cartridges each cartridge containing multiple individual quanta of a particular reagent;

a computer to automatically calculate the number of quanta needed to synthesize said user-specified formulation with appropriate concentrations for a desired volume specified by the user;

a dispenser disposed to automatically eject any whole number of quanta of reagents from said cartridges as specified by said computer;

an enclosure; and an output disposed to allow removal of said formulation from said device.

8. A device as in claim 7 disposed with an inventory management system capable of automatically maintaining a Duplicate Cartridge Protocol for multiple reagents.

9. A device as in claim 7 wherein a portioning chamber is disposed to fractionate at least one of said quanta to be added to the formulation.

10. A device as in claim 7 wherein said output is compliant to fit the input of various different vessels.

11. A method of automated laboratory formulation production which comprises:

providing a plurality of distinct pre-quantized reagents in non-blister pack form, contained in a plurality of separate cartridges;

receiving a user input specifying a desired chemical composition and a target volume;

selectively ejecting a computed number of quanta of reagents from at least one of said cartridges;

providing at least one liquid solvent;

ejecting a computed quantity of said at least one liquid solvent; and mixing said computed number of quanta of reagents with said liquid solvent.

12. A method as in claim 11 further comprising a step where a desired pH of said formulation can be synthesized by dispensing a computed number of reagent quanta without the need for pH measurement.

13. The method as in claim 11, further comprising steps of:

selectively dispensing said quanta into a mixing chamber;

selectively dispensing said liquid solvent into said mixing chamber;

mixing contents of said mixing chamber; and discharging contents of said mixing chamber via an output port.

14. The method as in claim 11 further comprising steps to improve the accuracy of said formulation wherein:

a portion of the contents of a mixing chamber is computed;

only said portion is discharged to a port; and an additional amount of liquid solvent is computed and dispensed to dilute said portion.

15. A method as in claim 11 further comprising:

labeling each of said cartridges with assay information as to the dosage of each of said quanta contained therein in a machine-readable format.

16. A method as in claim 11 further comprising:

writing and storing updated information as to the number of remaining quanta in each of said cartridges concomitant with said step of ejecting.

* * * * *